(12) United States Patent
Hirson et al.

(10) Patent No.: US 8,412,626 B2
(45) Date of Patent: Apr. 2, 2013

(54) SYSTEMS AND METHODS TO SECURE TRANSACTIONS VIA MOBILE DEVICES

(75) Inventors: Ron Hirson, San Francisco, CA (US); Martine Niejadlik, Los Altos, CA (US)

(73) Assignee: Boku, Inc., San Francsico, CA (US)

( * ) Notice: Subject to any disclaimer, the term of this patent is extended or adjusted under 35 U.S.C. 154(b) by 149 days.

(21) Appl. No.: 12/962,048

(22) Filed: Dec. 7, 2010

(65) Prior Publication Data

US 2011/0143711 A1    Jun. 16, 2011

Related U.S. Application Data

(60) Provisional application No. 61/285,519, filed on Dec. 10, 2009.

(51) Int. Cl.
*G06Q 40/00* (2006.01)

(52) U.S. Cl. ............................................. 705/39; 705/35

(58) Field of Classification Search ............... 705/35–40
See application file for complete search history.

(56) References Cited

U.S. PATENT DOCUMENTS

| | | | |
|---|---|---|---|
| 5,283,829 A | 2/1994 | Anderson | |
| 5,708,422 A | 1/1998 | Blonder et al. | |
| 5,845,260 A | 12/1998 | Nakano et al. | |
| 5,905,873 A | 5/1999 | Hartmann et al. | |
| 5,914,472 A | 6/1999 | Foladare et al. | |
| 5,953,710 A | 9/1999 | Fleming | |
| 6,282,276 B1 | 8/2001 | Felger | |
| 6,302,326 B1 | 10/2001 | Symonds et al. | |
| 6,473,808 B1 | 10/2002 | Yeivin et al. | |
| 6,612,488 B2 | 9/2003 | Suzuki | |
| 6,704,409 B1 | 3/2004 | Dilip et al. | |
| 6,718,178 B1 | 4/2004 | Sladek et al. | |
| 6,788,771 B2 | 9/2004 | Manto | |
| 6,807,410 B1 | 10/2004 | Pailles et al. | |
| 6,928,558 B1 | 8/2005 | Allahwerdi et al. | |
| 6,965,872 B1 | 11/2005 | Grdina | |

(Continued)

FOREIGN PATENT DOCUMENTS

| | | |
|---|---|---|
| GB | 2379525 | 3/2003 |
| JP | 2007109014 | 4/2007 |

(Continued)

OTHER PUBLICATIONS

European Patent Application No. 09711520,8. Extended Search Report mailed Apr. 27, 2011.

(Continued)

*Primary Examiner* — Thu Thao Havan
(74) *Attorney, Agent, or Firm* — Stephen M. De Klerk

(57) ABSTRACT

Systems and methods are provided to improve security of payment transactions via mobile communications. In one aspect, a system includes an interchange having a common format processor and a plurality of converters to interface with a plurality of different controllers of mobile communications. The converters are configured to communicate with the controllers in different formats and to communicate with the common format processor in a common format for the confirmation of payment requests, made via mobile phones. The common format processor is to determine a risk of a payment request being fraudulent based on the personal identification information associated with a mobile phone and, after the payment request is confirmed and when the risk is below a threshold, to communicate one or more premium messages to the mobile phone to collect funds to fulfill the payment request.

21 Claims, 15 Drawing Sheets

U.S. PATENT DOCUMENTS

| | | |
|---|---|---|
| 6,996,409 B2 | 2/2006 | Gopinath et al. |
| 7,013,125 B2 | 3/2006 | Henrikson |
| 7,080,049 B2 | 7/2006 | Truitt et al. |
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,660,772 B2 * | 2/2010 | Verkama ................... 705/67 |
| 7,748,614 B2 | 7/2010 | Brown |
| 7,752,135 B2 | 7/2010 | Brown et al. |
| 7,792,518 B2 | 9/2010 | Trioano et al. |
| 7,848,500 B2 | 12/2010 | Lynam et al. |
| 7,848,980 B2 * | 12/2010 | Carlson ................... 705/35 |
| 7,870,044 B2 | 1/2011 | Robertson |
| 7,870,077 B2 | 1/2011 | Woo et al. |
| 7,890,433 B2 | 2/2011 | Singhal |
| 8,073,774 B2 | 12/2011 | Pousti |
| 8,116,730 B2 | 2/2012 | Smith |
| 2001/0003093 A1 | 6/2001 | Lundin |
| 2001/0037264 A1 | 11/2001 | Husemann et al. |
| 2002/0013727 A1 | 1/2002 | Lee |
| 2002/0016769 A1 | 2/2002 | Barbara et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0065525 A1 | 4/2003 | Giachhetti et al. |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0212601 A1 | 11/2003 | Silva et al. |
| 2004/0019564 A1 | 1/2004 | Goldthwaite et al. |
| 2004/0044582 A1 | 3/2004 | Chowdhary |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1 | 12/2004 | Panchal |
| 2004/0252814 A1 | 12/2004 | Eakin |
| 2005/0055296 A1 | 3/2005 | Hattersley et al. |
| 2005/0055309 A1 | 3/2005 | Williams et al. |
| 2005/0086164 A1 | 4/2005 | Kim et al. |
| 2005/0177442 A1 | 8/2005 | Sullivan et al. |
| 2005/0177517 A1 | 8/2005 | Leung et al. |
| 2005/0199709 A1 | 9/2005 | Linlor |
| 2005/0245257 A1 | 11/2005 | Woodhill |
| 2006/0018450 A1 | 1/2006 | Sandberg-Diment |
| 2006/0131390 A1 | 6/2006 | Kim |
| 2006/0206709 A1 | 9/2006 | Labrou et al. |
| 2006/0248011 A1 | 11/2006 | Hecht-Nielsen |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2006/0294025 A1 | 12/2006 | Mengerink |
| 2007/0005467 A1 | 1/2007 | Haigh et al. |
| 2007/0011104 A1 | 1/2007 | Leger et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0063017 A1 | 3/2007 | Chen et al. |
| 2007/0094080 A1 | 4/2007 | Wiken |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0124490 A1 | 5/2007 | Kalavade et al. |
| 2007/0130025 A1 | 6/2007 | Nakajima |
| 2007/0130044 A1 | 6/2007 | Rowan |
| 2007/0133768 A1 | 6/2007 | Singh |
| 2007/0168462 A1 | 7/2007 | Grossberg |
| 2007/0175978 A1 | 8/2007 | Stambaugh |
| 2007/0198510 A1 | 8/2007 | Ebanks |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro et al. |
| 2007/0250711 A1 | 10/2007 | Storey |
| 2007/0255653 A1 | 11/2007 | Tumminard et al. |
| 2007/0255662 A1 | 11/2007 | Tumminaro et al. |
| 2007/0260556 A1 | 11/2007 | Pousti |
| 2007/0265921 A1 | 11/2007 | Rempe |
| 2007/0266034 A1 | 11/2007 | Pousti |
| 2007/0266130 A1 | 11/2007 | Mazur et al. |
| 2007/0270125 A1 | 11/2007 | Pousti |
| 2008/0009263 A1 | 1/2008 | Pousti |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0167017 A1 | 7/2008 | Wentker et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0275779 A1 | 11/2008 | Lakshminarayanan |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2009/0006184 A1 | 1/2009 | Leach et al. |
| 2009/0006217 A1 | 1/2009 | Smith |
| 2009/0024614 A1 | 1/2009 | Pousti |
| 2009/0029687 A1 | 1/2009 | Ramer et al. |
| 2009/0044216 A1 | 2/2009 | McNicoll |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |

| | | | |
|---|---|---|---|
| 2009/0177581 A1 | 7/2009 | Garcia et al. | |
| 2009/0182634 A1 | 7/2009 | Park et al. | |
| 2009/0182674 A1 | 7/2009 | Patel et al. | |
| 2009/0192928 A1 | 7/2009 | Abifaker | |
| 2009/0204546 A1 | 8/2009 | Haidar | |
| 2009/0216687 A1 | 8/2009 | Burdick | |
| 2009/0220060 A1 | 9/2009 | Wilson | |
| 2009/0248483 A1 | 10/2009 | Kiefer | |
| 2009/0265273 A1 | 10/2009 | Guntupali et al. | |
| 2009/0281904 A1 | 11/2009 | Pharris | |
| 2010/0010911 A1 | 1/2010 | Smith | |
| 2010/0015944 A1 | 1/2010 | Smith | |
| 2010/0015957 A1 | 1/2010 | Smith | |
| 2010/0017285 A1 | 1/2010 | Smith | |
| 2010/0049654 A1 | 2/2010 | Pilo | |
| 2010/0057623 A1 | 3/2010 | Kapur et al. | |
| 2010/0070757 A1 | 3/2010 | Martinez | |
| 2010/0094732 A1 | 4/2010 | Smith | |
| 2010/0106620 A1 | 4/2010 | Marcus | |
| 2010/0114775 A1 | 5/2010 | Griffen | |
| 2010/0125514 A1 | 5/2010 | Blackhurst et al. | |
| 2010/0145802 A1 | 6/2010 | Nowacek et al. | |
| 2010/0153249 A1 | 6/2010 | Yuan et al. | |
| 2010/0179907 A1 | 7/2010 | Atkinson | |
| 2010/0190471 A1 | 7/2010 | Smith | |
| 2010/0191646 A1 | 7/2010 | Smith | |
| 2010/0191648 A1 | 7/2010 | Smith | |
| 2010/0216425 A1 | 8/2010 | Smith | |
| 2010/0217696 A1 | 8/2010 | Schuba et al. | |
| 2010/0223183 A1 | 9/2010 | Smith | |
| 2010/0235276 A1 | 9/2010 | Smith | |
| 2010/0250359 A1 | 9/2010 | Gillenson et al. | |
| 2010/0250687 A1 | 9/2010 | Smith | |
| 2010/0267362 A1 | 10/2010 | Smith | |
| 2010/0299220 A1 | 11/2010 | Baskerville | |
| 2010/0299731 A1 | 11/2010 | Atkinson | |
| 2010/0306015 A1 | 12/2010 | Kingston | |
| 2010/0306099 A1 | 12/2010 | Hirson | |
| 2010/0312645 A1 | 12/2010 | Niejadlik | |
| 2010/0312678 A1 | 12/2010 | Davis | |
| 2011/0010292 A1 | 1/2011 | Giordano et al. | |
| 2011/0022484 A1 | 1/2011 | Smith et al. | |
| 2011/0035264 A1 | 2/2011 | Zaloom | |
| 2011/0035302 A1 | 2/2011 | Martell et al. | |
| 2011/0065418 A1 | 3/2011 | Ryu et al. | |
| 2011/0071922 A1 | 3/2011 | Hirson et al. | |
| 2011/0072039 A1 | 3/2011 | Tayloe | |
| 2011/0078077 A1 | 3/2011 | Hirson | |
| 2011/0082767 A1 | 4/2011 | Ryu et al. | |
| 2011/0082772 A1 | 4/2011 | Hirson | |
| 2011/0125610 A1 | 5/2011 | Goodsall et al. | |
| 2011/0143710 A1 | 6/2011 | Hirson | |
| 2011/0143711 A1 | 6/2011 | Hirson | |
| 2011/0295750 A1 | 12/2011 | Rammal | |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2006/092726 A2 | 9/2006 |
| WO | WO-2007004792 | 1/2007 |
| WO | WO-2007084593 | 7/2007 |
| WO | 2007102648 | 9/2007 |
| WO | 2007127521 | 11/2007 |
| WO | WO-2009/036511 | 3/2009 |
| WO | 2009044396 | 4/2009 |

OTHER PUBLICATIONS

International Application No. PCT/US2010/050616, International Search Report and Written Opinion, Apr. 26, 2011.
International Application No. PCT/US2011/30039, International Search Report and Written Opinion, May 23, 2011.
International Application No. PCT/US2011/30038, International Search Report and Written Opinion, May 25, 2011.
Onebip S.R.L , "OneBio—to Pay Online with Your Mobile Phone", Youtube online video at http://www.youtube.com/watch?v=RiEsMcc0tJY, May 23, 2007.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod , "MobilCash:Worlds First in Mobile Payments", YouTube online video located at http://youtube.com/wacth?v=j6Xv35qSmbg,, Oct. 12, 2007.
Bruene, Jim , "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.
Chen, Will , "Gift Shop Credits Have Arrived", The Facebook Blog, located at gttp://blog.facebook.com/blog.php?post=36577782130, Oct. 31, 2008.
Federal Trade Commission, "Children's Online Privacy Protection Act (COPPA)", 15 U.S.C. §§ 6501-6506, Oct. 21, 1998.
Ihlwan, Moon , "In Korea, Cell Phones Get a New Charge", http://businessweek.com/globalbiz/content/mar2006/gb20060301_260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.
Nicole, Kirsten , "Pay me Lets You Send and Receive Money Through Facebook", http://mashable.com/2007/06/17pay-me-facebook-app, Jun. 17, 2007.
Zong, Inc., , "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.
Zong, Inc., "Zong Mobile Payment Demo on a Facebook App." You Tube online video at http://www.youtube.com/watch?v=aLjRcAFrGil, Jan. 5, 2009.
Zong, Inc., "Zong- Mobile Payments for Your Web App", You tube online video at http://www.youtube.com/watch?v=O2C3SQraAvQ, Sep. 5, 2008.
Zong, Inc., , "Zong Mobile Payments in Smallworlds", You Tube online video at htttp://www.youtube.com/watch?v=Y6CEw3tSgBc, Feb. 10, 2009.
"International Application No. PCT/US2011/029760", International Search Report and Written Opinion, Oct. 28, 2011.
"International Application No. PCT/US2011/051094", International Search Report and Written Opinion, Dec. 23, 2011.
Amazon.com, Inc., "Get Gold Box Deals Every Day with Amazon Text Alerts," located at http://www.amazon.com/gp/anywhere/sms/goldbox, available at least by Jun. 10, 2009.
Aradiom Inc., "The Real Solution—Aradiom SolidPass", located at http://www.aradiom.com/SolidPass/2fa-OTP-security-token.htm, available at least by Apr. 24, 2009.
Chua, Lye Heng, "How Customers Applied Java CAPS?" Sun Microsystems, Inc. presentation, Nov. 6, 2007.
Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.
International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024525, International Search Report and Written Opinion, May 17, 2010.
International Application No. PCT/US2010/024535, International Search Report and Written Opinion, May 25, 2010.
International Application No. PCT/US2010/030338, International Search Report & Written Opinion, Jun. 3, 2010.

International Application No. PCT/US2010/032668, International Search Report and Written Opinion, Jul. 1, 2010.

International Application No. PCT/US2010/036940, International Search Report and Written Opinion, Jul. 21, 2010.

International Application No. PCT/US2010/037816, International Search Report and Written Opinion, Aug. 5, 2010.

International Application No. PCT/US2010/042703, International Search Report and Written Opinion, Sep. 13, 2010.

International Application No. PCT/US2010/046266, International Search Report and Written Opinion, Oct. 20, 2010.

International Application No. PCT/US2010/057472, International Search Report and Written Opinion, Jan. 18, 2011.

International Application No. PCT/US2010/059295, International Search Report and Written Opinion, Feb. 1, 2011.

International Application No. PCT/US2010/059466, International Search Report and Written Opinion, Feb. 1, 2011.

International Application No. PCT/US2011/022419, International Search Report and Written Opinion, Mar. 29, 2011.

International Application No. PCT/US2011/022426, International Search Report and Written Opinion, Mar. 28, 2011.

Mobilians Co. Ltd., company website located at http://www.mobilians.co.kr/english/, available at least by Jan. 12, 2009.

PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.

PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.

Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.

Sun Microsystems Inc., "The Road to Mobile Banking," white paper, Jun. 2008.

Tindal, Suzanne, "St. George Counts Down to Two-Factor Authentication," ZDNet Australia, Feb. 19, 2008.

Trusted Mobile Payment Framework, "Scheme Rules," version 2.0, Aug. 6, 2008.

VISUALtron Software Corporation, "2-Factor Authentication—What is MobileKey?" located at http://www.visualtron.com/products_mobilekey.htm, available at least by 2008.

Wikimedia Foundation, Inc., "Authentication," located at en.wikipedia.org/wiki/Authentication, Mar. 17, 2009.

Wikimedia Foundation, Inc., "Credit Card," located at en/wikipedia.org/wiki/Credit_card, Dec. 5, 2008.

Wikimedia Foundation, Inc., "Security Token," located at en.wikipedia.org/wiki/Security_token, Apr. 13, 2009.

Wikimedia Foundation, Inc., "Two-Factor Authentication," located at en.wikipedia.org/wiki/Two-factor_authentication, Apr. 24, 2009.

Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.

International Application No. PCT/US12/25195, International Filing Date Feb. 15, 2012, International Search Report and Written Opinion, Apr. 26, 2012.

* cited by examiner

SYSTEMS AND METHODS TO SECURE TRANSACTIONS VIA MOBILE DEVICES

CROSS-REFERENCE TO RELATED APPLICATIONS

The present application claims the benefit of Provisional U.S. Patent Application Ser. No. 61/285,519, filed Dec. 10, 2009 and entitled "Systems and Methods to Secure Transactions via Mobile Devices," the disclosure of which is hereby incorporated herein by reference.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to facilitate online transactions via mobile communications. Some embodiments are summarized in this section.

In one aspect, a system includes a data storage facility to store and associate personal identification information with a mobile phone number of a user and an interchange coupled with the data storage facility. The interchange includes a common format processor and a plurality of converters to interface with a plurality of different controllers of mobile communications. The converters are configured to communicate with the controllers in different formats; and the converters are configured to communicate with the common format processor in a common format.

In one embodiment, the common format processor is configured to instruct a first controller of the controllers, via a first converter of the converters, to communicate with a mobile phone at the mobile phone number of the user to confirm a payment request and obtain second personal identification information, to determine a risk of the request being fraudulent based on a distance between the first personal identification information and the second personal identification information and, after the request is confirmed and when the risk is below a threshold, to communicate one or more premium messages to the mobile phone to collect, via a telecommunication carrier of the mobile phone, funds in accordance with the request.

In another aspect, a method includes: receiving in a server computer a request for a transaction between a first party and a second party, the request including an indication of a phone number of the first party and an amount to be paid to the second party; in response to the request, communicating by the server computer with a mobile phone at the phone number to confirm the transaction; determining, by the server computer, a value indicating a risk of the request being fraudulent, based on personal identification information of the first party; and after the transaction is confirmed and if the risk as indicated by the value is below a threshold, transmitting by the server computer one or more premium messages to the mobile phone to collect, via a telecommunication carrier of the mobile phone, funds in accordance with the amount to be paid to the second party.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to associate account information with phone numbers to facilitate electronic payments via mobile devices, such as cellular phones. The interchange is configured to communicate with the mobile phones through the different controllers to provide security and convenience for online transactions.

Figure 1:
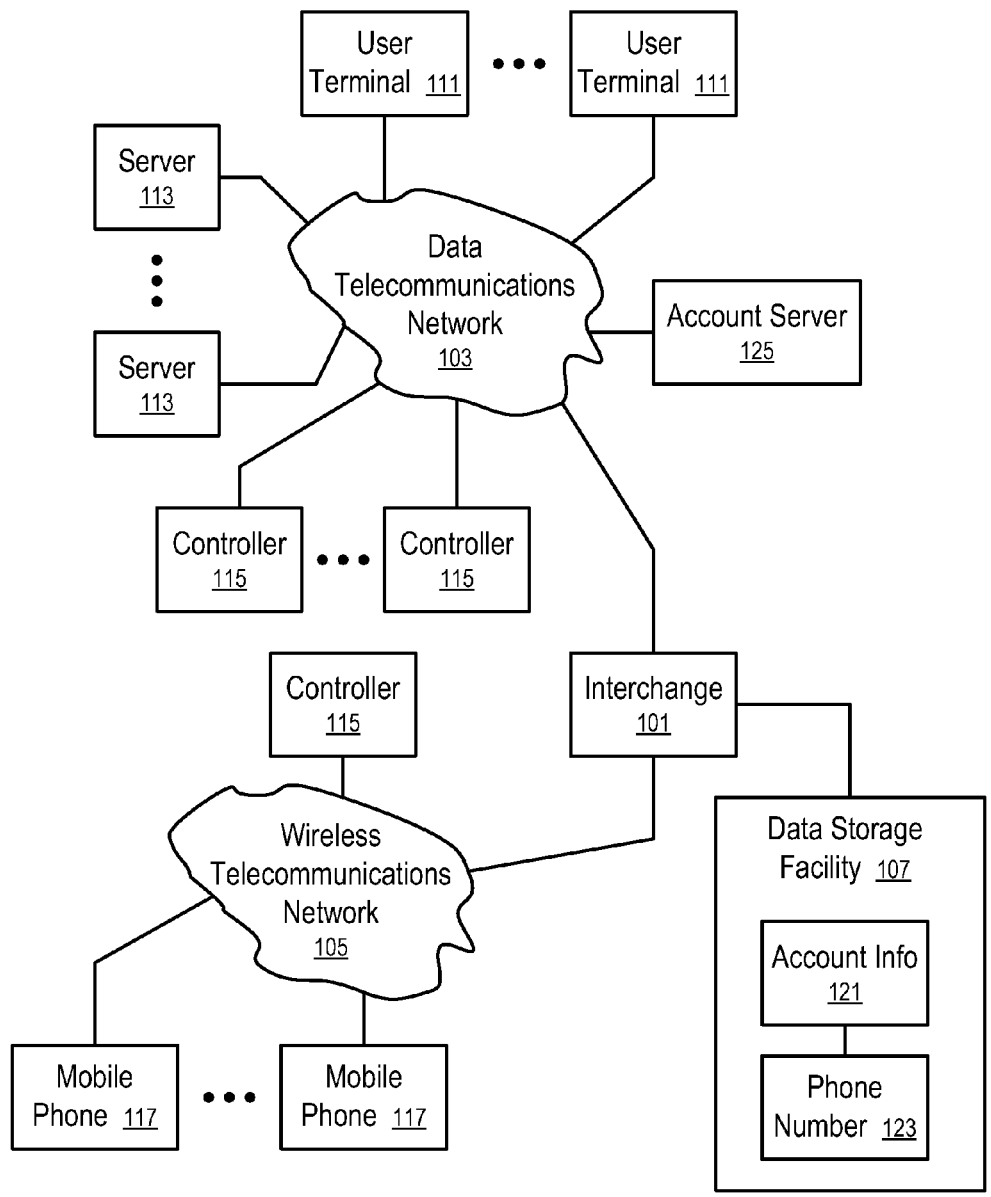
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user account information (121) and the corresponding phone numbers (123) of the mobile phones (117). The interchange (101) is coupled with the data storage facility (107) to communicate with the mobile phones (117) at the corresponding phone numbers (123) to confirm operations that are performed using the account information (121). Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding account information (121), such as bank accounts, credit card numbers, charge card numbers, etc.

In FIG. 1, the user terminals (111) may use a unified interface to send requests to the interchange (101). For example, a web site of the interchange (101) may be used to receive the account information (121) from the web browsers running in the user terminals (111). The user terminals (111) are typically different from the mobile phones (117). However, in some embodiments, users may use the mobile phone (117) to access the web and submit the account information (121). Alternatively, the users may use the mobile phone (117) to submit the account information (121) to the interchange (101) via text messaging, email, instant messaging, etc.

The use of the mobile phones (117) in the confirmation of activities that involve the account information (121) increases the security of the transaction, since the mobile phones (117) are typically secured in the possession of the users.

Further, in one embodiment, the interchange (101) may use the phone bills of the mobile phones (117) to pay for purchases, in order to use the account information (121) to pay for the phone bills, and/or to deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phones (117) via their phone numbers (123) stored in the data storage facility (107), the users may use the user terminals (111) to access online servers (113) of various merchants or service providers to make purchases. From the user terminals (111), the users can use the accounts identified by the account information (121) to make the payment for the purchases, without revealing their account information (121) to the operators of the servers (113).

In one embodiment, the mobile phones (117) are used by the corresponding users to make payments and/or manage funds, such as for making purchases in various websites hosted on the servers (113) of merchants and service providers and/or for transferring funds to or from an account identified by the account information (121), such as phone bills of land-line telephone services, credit card accounts, debit card accounts, bank accounts, etc., or an account hosted on the data storage facility (107) or telecommunication accounts of the mobile phones (117) with telecommunication carriers. The mobile phones (117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone number (123)).

For example, the user terminal (111) may provide the phone numbers (123) to the servers (113) to allow the servers (113) to charge the account identified by the account information (121) associated with the phone number (123). The interchange (101) sends a message to the mobile phone (117) via the phone number (123) to confirm the payment request. Once the payment is confirmed or approved via the corresponding mobile phone (117), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) may not even provide the phone number (123) to the server (113) to process the payment. The server (113) may redirect a payment request to the interchange (101), which then prompts the user terminal (111) to provide the phone number (123) to the web site of the interchange (101) to continue the payment process.

For example, the server (113) may redirect the payment request to the web site of the interchange (101) with a reference indicating the purchase made via the user terminal (111). The interchange (101) can use the reference to subsequently complete the payment with the server (113) for the purchase, after receiving the phone number (123) directly from the user terminal (111) to confirm the payment via the mobile phone (117).

In some embodiments, instead of directly providing the phone number (123) to identify the account information (121), the user may provide other information to identify the phone number (123), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (117) via a secure connection.

Alternatively, the user may supply the account information (121) to the interchange (101) at the time the payment request is submitted from the user terminal (111) to the interchange (101). Alternatively, the user may supply the account information (121) to the interchange (101) at the time the user responds to the confirmation message for the payment request.

In some embodiments, the user may supply the account information (121) after a transaction using funds collected via the telecommunication carrier of the mobile phone (117) at the phone number (123). For example, after the transaction, the interchange (101) may send an invitation message, such as a text message to the mobile phone (117) at the phone number (123), to the user to invite the user to register with the interchange (101) and provide the account information (121). The user may register with the interchange (101) via the mobile phone (117) (e.g., by a replying text message), or via a web page of the interchange (101) (e.g., using a link and/or a unique code provided in the invitation message).

After the user registers with the interchange (101) (e.g., via the mobile phone (117) and by providing the account information (121)), the user may create a customized personal identification number (PIN) or receive a PIN for enhanced security. Using the PIN, the user may use the account information (121) to complete an online transaction without having to confirm and/or approve a transaction using the mobile phone (117). In some embodiments, the PIN may be used to reduce unwanted messages to the mobile phone (117). For example, once the phone number (123) and the account information (121) are associated with a PIN, the interchange (101) may require the user of the user terminal (111) to provide the correct PIN to initiate the payment process. Thus, a spammer having only the phone number (123) (or a different user mistakenly using the phone number (123)) may not successfully use the user terminal (111) to request the interchange (101) to send confirmation messages to the mobile phone (117) protected by the PIN. In some embodiments, the interchange (101) may offer further incentives to the user for registering with the interchange (101), such as reduced fees, discounts, coupons, free products and services, etc.

In one embodiment, once the account information (121) is associated with the phone number (123) in the data storage facility (107), the user does not have to resubmit the account information (121) in subsequent payment requests.

By delegating the payment task to the interchange (101) and securing the account information (121) in the data storage facility (107), the system as shown in FIG. 1 can increase the security of using the account information (121) in an online environment.

In some embodiments, the interchange (101) can also fulfill the payment requests using the funds collected via the phone bill of the phone numbers (123). The interchange (101) can collect the funds via sending premium messages to the mobile phones (117) at the phone numbers (123), after receiving confirmation from the mobile phone (117).

For example, after the confirmation or approval message is received from the mobile phone (117), the interchange (101) performs operations to collect funds via the phone bill of the phone number (123). The interchange (101) may calculate the required premium messages to bill to the mobile phone (117). For example, mobile terminated premium SMS messages may have a predetermined set of prices for premium messages. The interchange (101) determines a combination of the premium messages that has a price closest to the amount required by the transaction, and sends this combination of premium messages to the mobile phone (117). For example, mobile originated premium SMS messages may also have a predetermined set of prices for premium messages. The interchange (101) can calculate the set of messages required for the transaction and transmit a text message to the mobile phone (117) of the user to instruct the user to send the required number of premium messages to provide the funds.

Figure 2:
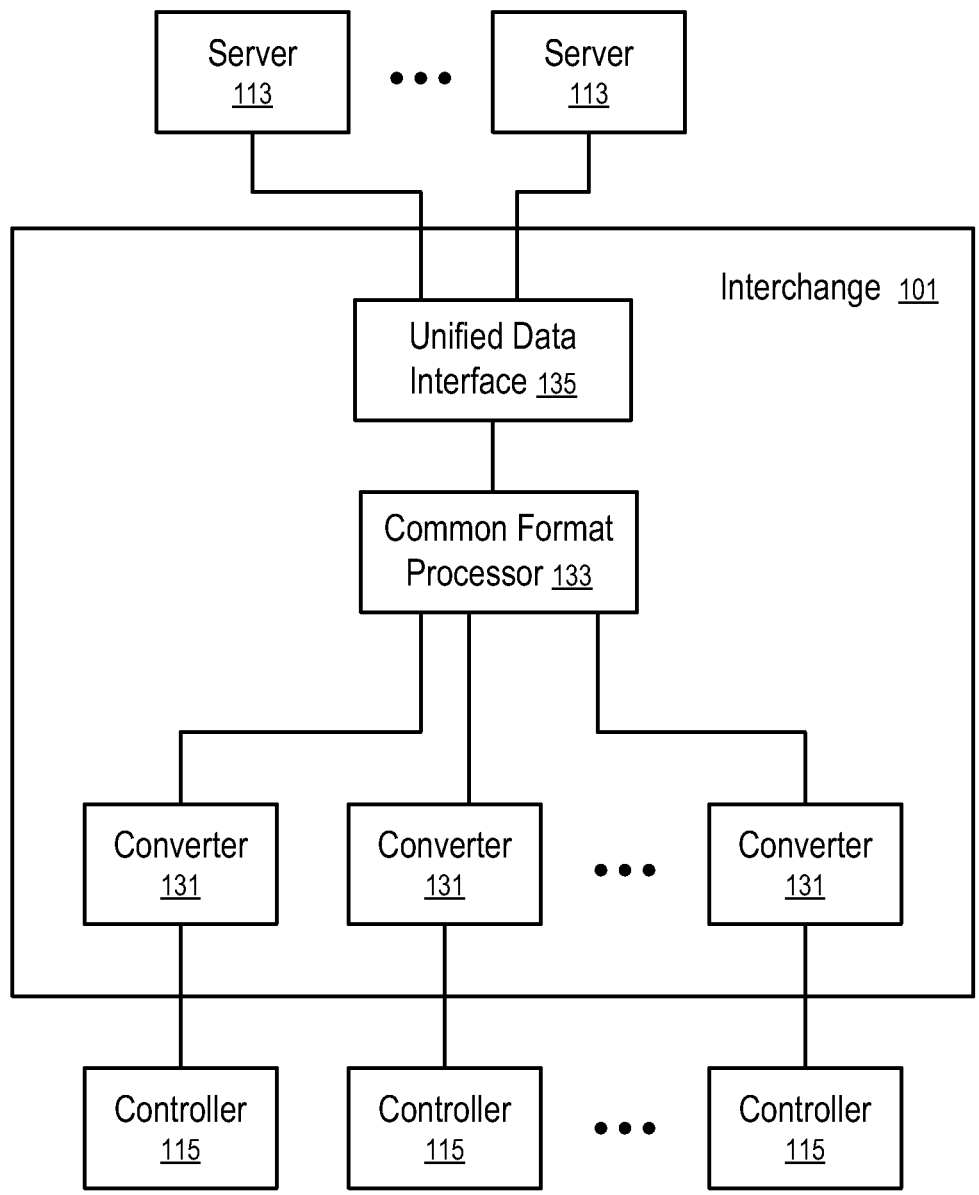
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (123), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
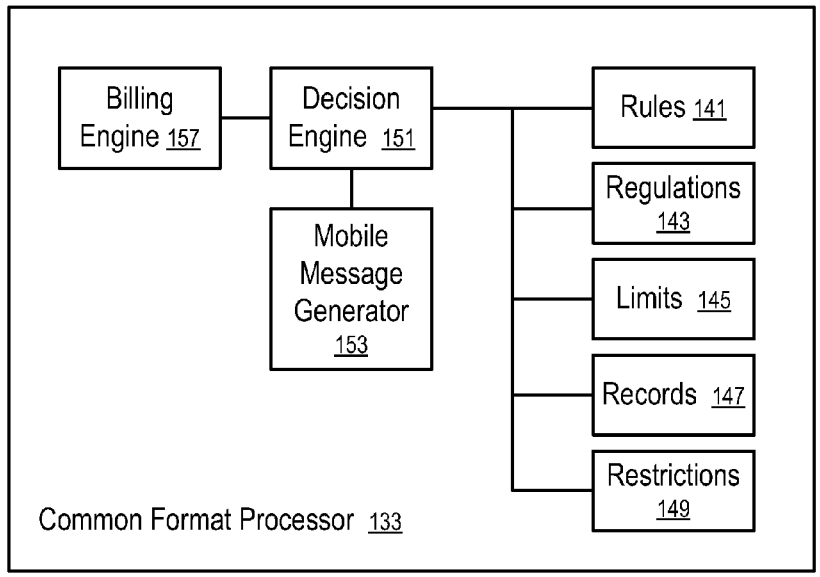
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange (101) directly sends a message to the mobile carrier of the mobile phone (117) to bill the amount on the phone bill of the mobile phone (117), without having to send a premium message to the mobile phone (117).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (117) about the transaction (e.g., a request to collect funds via the phone bill of the user for a payment request, or for deposit into an account identified by the account information (121)). The converter (131) then interfaces with the corresponding controller (115) to transmit the messages to the mobile phones (117).

Figure 4:
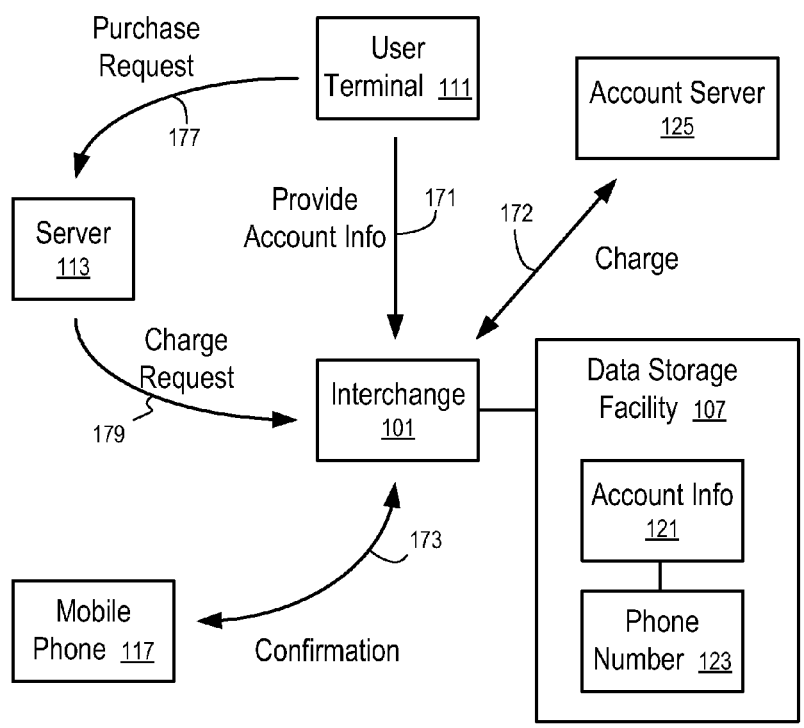
FIG. 4 shows a method to facilitate an online transaction using an interchange according to one embodiment.

FIG. 4 shows a method to facilitate an online transaction using an interchange according to one embodiment. In FIG. 4, the user terminal (111) provides (171) account information (121) to the interchange (101) for association with the phone number (123). For example, the user may use a device running a web browser as the user terminal (111) to submit the account information (121) via a secure web connection. The user terminal (111) is typically different from the mobile phone (117). However, in some embodiments, the mobile phone (117) may also be used as the user terminal (111) to submit the account information (121) (e.g., via a wireless application protocol (WAP) application, or via a message sent via short message service (SMS) or multimedia message service (MMS), or via an email message or an instant message).

After the user provides the account information (121) to the interchange (101) for storage in the data storage facility (107), the user can send (177) a charge request to the server (113) of a merchant from the user terminal (111). The server (113) of the merchant can send or redirect (179) the charge request to the interchange (101). In response to the charge request, the interchange (101) sends (173) a confirmation message to the mobile phone (117). If the user sends (173) an approval, or an appropriate reply, to the confirmation message from the mobile phone (117), the interchange (101) communicates with the account server (125) to charge an account of the user identified by the account information (121), without revealing the account information (121) to the server (113). The interchange (101) pays the merchant on behalf of the user using the funds collected via charging the account of the user. For example, the interchange (101) may use its own bank account to pay the merchant operating the server (113). Thus, the financial information of the user is not revealed to the merchant.

Upon the completion of the payment process, the interchange (101) can notify the user via the mobile phone (117) and/or the user terminal (111).

In some embodiments, the server (113) of the merchant redirects the charge request to allow the user terminal (111) to communicate with the interchange (101) to continue the payment process; and the user terminal (111) may provide (171)

the account information (121) directly to the interchange (101) after the charge request is redirected.

In alternative embodiments, the user may provide the account information (121) from the mobile phone (117) together with the approval of the charge request.

In one embodiment, the interchange (101) communicates with the mobile phone (117) for the confirmation of the charge request via SMS messages. Alternatively, the confirmation and approval messages can be sent (173) via emails, instant messages, voice message, live calls from operators, etc.

In some embodiments, the user of the mobile phone (117) may choose to fulfill the charge request via the phone bill, instead of charging the account identified by the account information (121). Thus, after the confirmation, the interchange (101) sends the premium messages to the mobile phone (117) to collect funds via the phone bill of the mobile phone (117). In other embodiments, the interchange (101) may send an instruction with the confirmation message to the mobile phone (117) to instruct the user to send mobile originated premium messages to the interchange (101) to collect the funds via the phone bill of the mobile phone (117).

Figure 5:
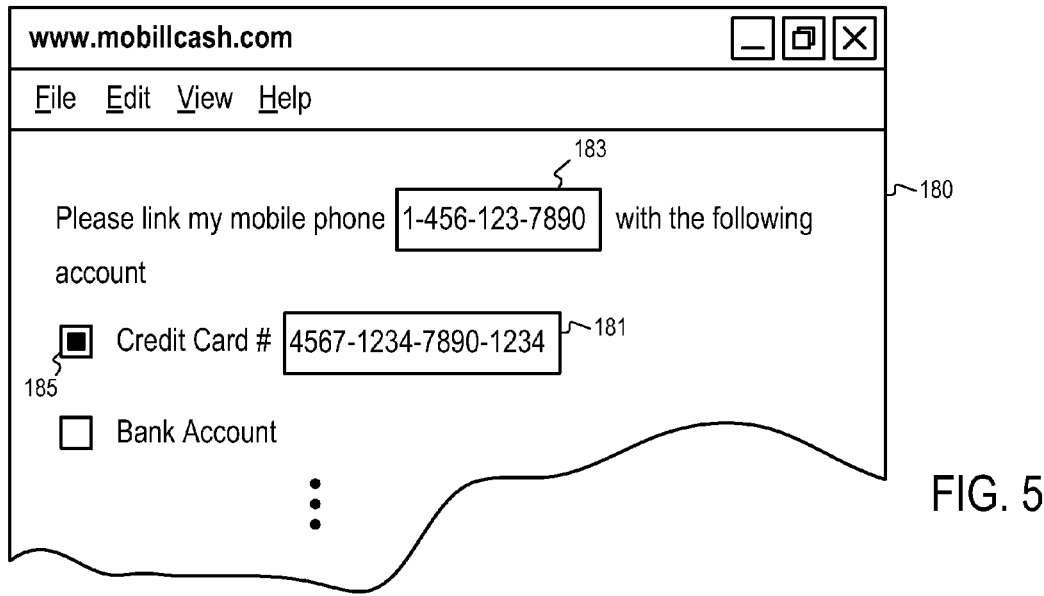
FIG. 5 illustrates a user interface to associate an account with a telephone number according to one embodiment.

FIG. 5 illustrates a user interface to associate an account with a telephone number according to one embodiment. In FIG. 5, the user interface (180) includes a text field (183) that allows the user to specify the phone number (123) with which the account information (121) provided in the text field (181) is to be associated.

In FIG. 5, the user interface (180) further includes an option list, which allows the user to select various types of accounts, such as credit card accounts, bank accounts, charge card accounts, etc. In the example illustrated in FIG. 5, the checkbox (185) is selected to specify a credit card account.

In some embodiments, the user interface (180) may further present a text field (not shown in FIG. 5) to allow the user to specify an alias for the account information (121) supplied in the text input field (181). For enhanced security, the alias can be used for subsequent communications with the user without revealing the account information (121).

In FIG. 5, the user interface (180) may be presented via a web browser (or a custom application) to submit account information (121) in the text input field (181) from a user terminal (111) to the interchange (101). Alternatively, the account number can be submitted from the mobile phone (117) via a message sent via SMS, WAP, voice mail, or via an interactive voice response (IVR) system.

Figure 6:
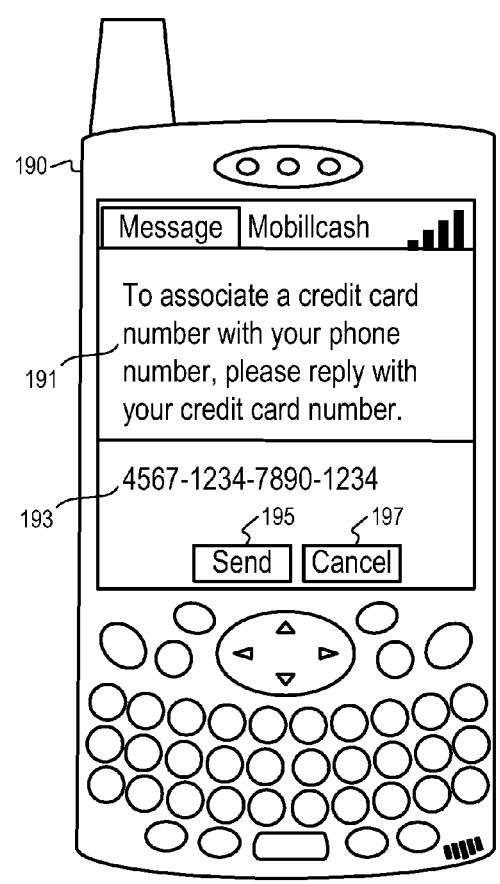
FIG. 6 illustrates another user interface to associate an account with a telephone number according to one embodiment.

FIG. 6 illustrates another user interface to associate an account with a telephone number according to one embodiment. In FIG. 6, the user interface (190) is presented on the mobile phone (117) of the user. The user interface (190) presents a message (191) from the interchange (101) to the mobile phone (117) at the phone number (123). The message (191) prompts the user to submit the account information (121) by providing a reply message (193). The user may select the "send" button (195) to provide the account information (121) for association with the phone number (123) or select the "cancel" button (197) to ignore the prompt.

In one embodiment, the messages (191 and 193) are transmitted to the mobile phone (117) via a short message service (SMS). Alternatively, the messages can be transmitted to the mobile phone (117) via other protocols, such as multimedia message service (MMS), email, instant messaging, WAP, voice mail, voice messages via an interactive voice response (IVR) system, etc.

Figure 7:
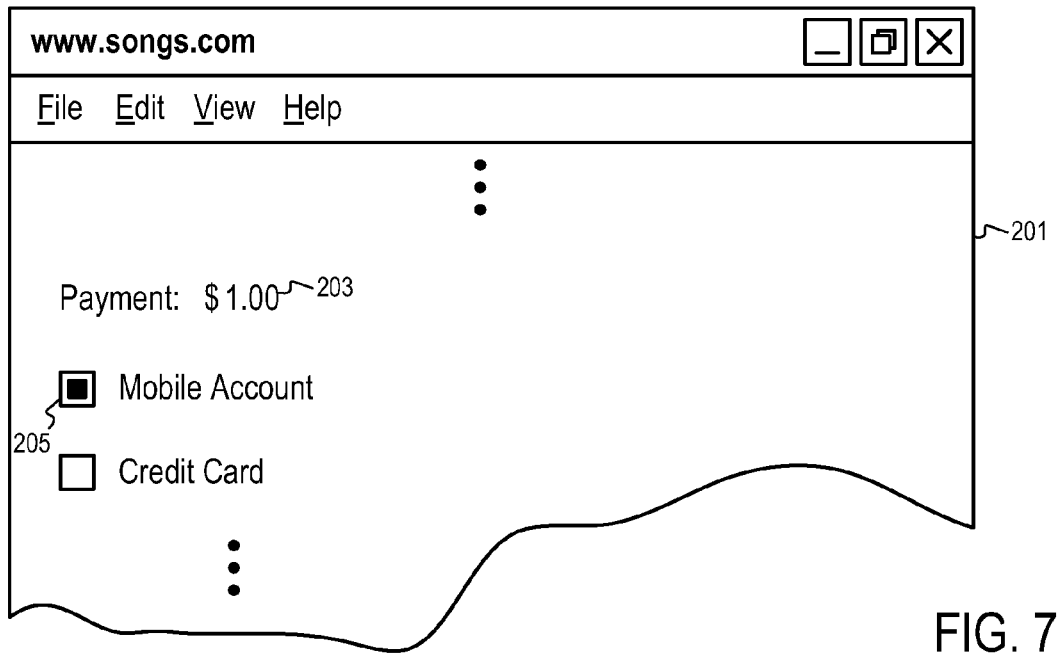
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number to the merchant to process the payment. Thus, the user does not have to visit the web site of the interchange (101) to complete the payment.

In one embodiment, the server (113) presents the payment option (205) via an online shopping cart system or a third party checkout system. Alternatively or in combination, the server (113) presents the payment option (205) via a web widget. For example, a web widget may include a program code that is portable and executable within a web page without requiring additional compilation. The web widget allows the user to select the option (205) to pay for the product and/or service without leaving the web page or refreshing the web page. In one embodiment, the interchange (101) provides the web widget to facilitate the payment processing.

Figure 8:
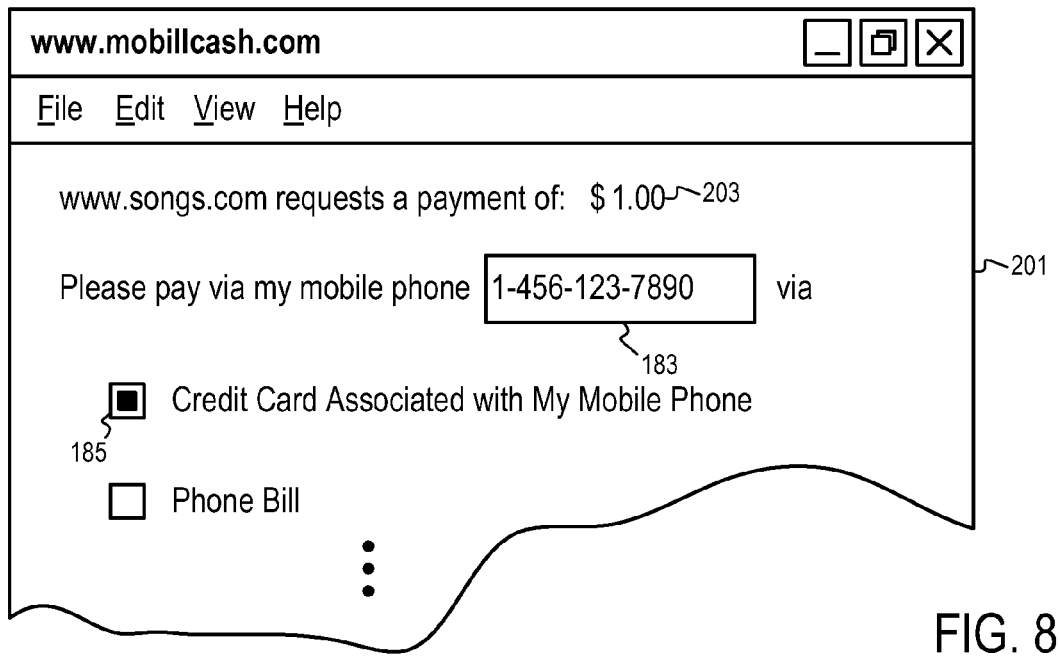
FIG. 8 illustrates a user interface to initiate a payment request according to one embodiment.

FIG. 8 illustrates a user interface to initiate a payment request according to one embodiment, after the payment request is redirected to the web site of the interchange (101). In FIG. 8, the user interface (201) includes the identity of the merchant and the amount (203) of the requested payment. The user interface (201) includes a text field (183) to allow the user to provide the phone number (123) to identify the account information (121) via its association with the phone number (123) in the data storage facility (107).

Further, user authentication may be used to reduce false messages to the phone number (123). For example, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number (123) to initiate the payment transaction. In some embodiments, the user interface (201) requires the user to provide no information other than the phone number (123) in the text field (183) to initiate the transaction.

In FIG. 8, the user interface (201) allows the user to select one option from a plurality of payment options, including paying via the phone bill, and paying via one or more of the accounts identified by the account information (121) associated with the phone number (123) in the data storage facility (107).

In some embodiments, the user interface (201) may present the payment options after authenticating the user (e.g., via a personal identification number or password) for enhanced security.

In some embodiments, the user interface (201) identifies the different accounts represented by the account information (121) by showing aliases of the accounts. The aliases may be previously specified by the user, or be dynamically generated by the interchange (101) based on the types of the accounts and/or portions of the account information (121) (e.g., the first or last few digits of the account number, etc.)

In one embodiment, once the user submits the payment request via the user interface (201), the interchange (101) transmits a confirmation message to the mobile phone (117) according to the phone number (123) provided in the text field (183). In one embodiment, the interchange (101) transmits the confirmation to the mobile phone (117) after the user is authenticated via the user interface (201) to reduce the possibility of unauthorized/unwelcome messages to the mobile phone (117), which may occur when the user intentionally or unintentionally provides an unrelated phone number in the entry box (183).

Figure 9:
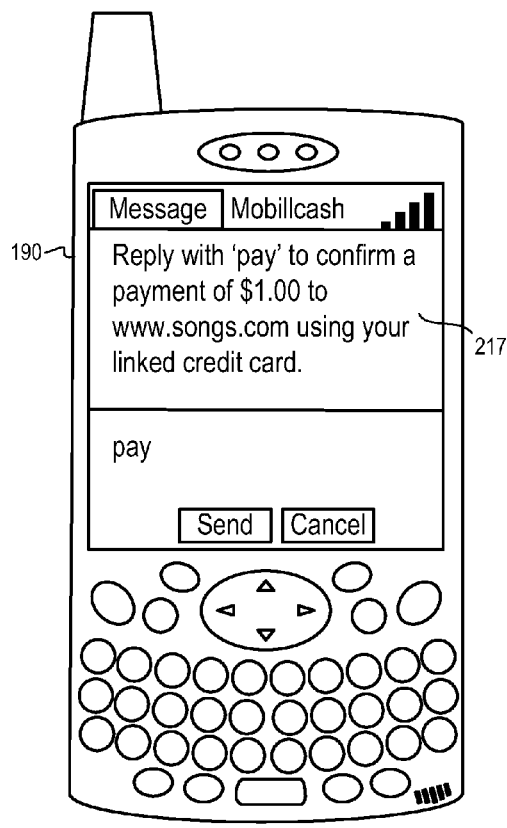
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 9.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the account, and/or a code (not shown) randomly generated and presented in the user interface used to initiate the payment transaction (e.g., user interface (201)).

In some embodiments, the code requested in the text message (217) may be a personal identification number (PIN) associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 8). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

After the correct reply is received, the interchange (101) communicates with the account server (125) to electronically charge the user using the account information (121) and pays the payee using the funds collected via communicating with the account server (125). The interchange (101) then notifies the user when the payment transaction is complete.

Figure 10:
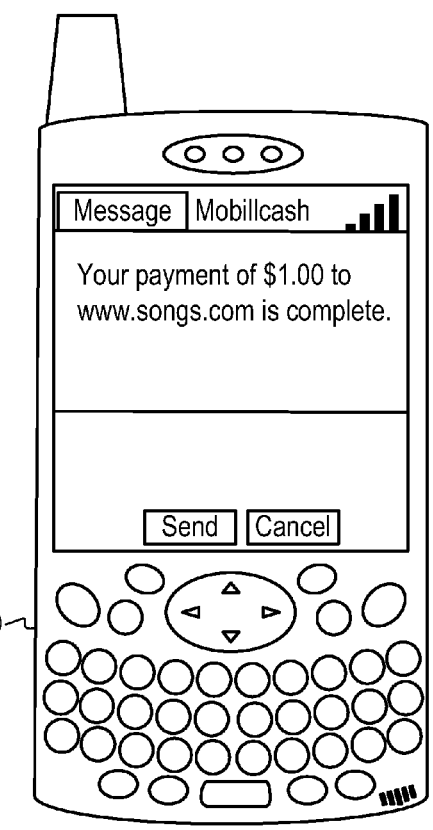
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
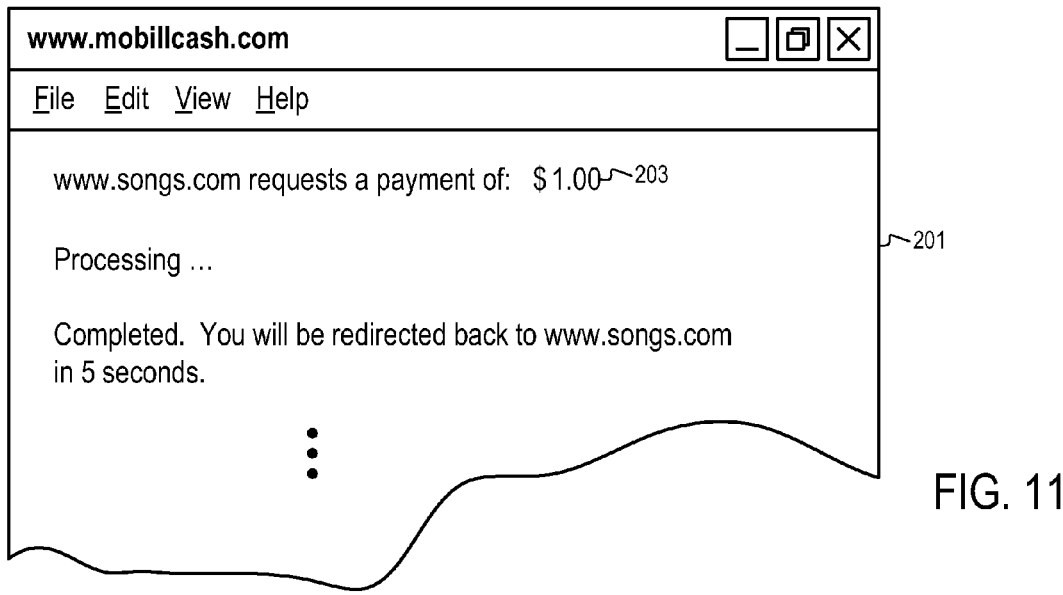
FIG. 11 illustrates a way to redirect a payment confirmation according to one embodiment.

FIG. 11 illustrates a way to redirect a payment confirmation according to one embodiment. For example, after the user submits the payment request to the interchange (101) via the user interface (201) shown in FIG. 8, the interchange (101) may present the user interface (201) illustrated in FIG. 11 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the user is required to provide the approval in response to the confirmation message (217), as illustrated in FIG. 9, within a predetermined period of time. If the user fails to provide the approval from the mobile phone (117) within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 12:
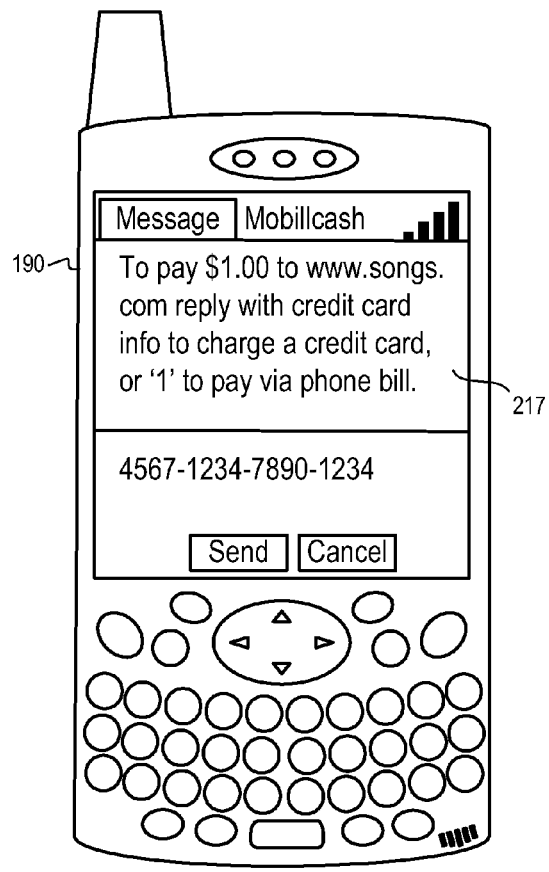
FIG. 12 illustrates a user interface to receive payment options according to one embodiment.

FIG. 12 illustrates a user interface to receive payment options according to one embodiment. In FIG. 12, the interchange (101) sends a message (217) to the mobile phone (117) to provide a number of options to the user. The message (217) identifies the amount (203) of the requested payment and the identity of the payee (e.g., a merchant operating the server (113)) and asks the user to approve the payment request via a reply that contains a selected payment option.

In FIG. 12, the user may reply with the code "1" to approve the payment request and to pay via the phone bill of the mobile phone (117). Alternatively, the user may reply with the credit card information to charge the payment to a credit card, as illustrated in FIG. 12.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.) Thus, each of the accounts can be identified to the user via the account type in the confirmation message, without revealing the details of the account information.

For example, the interchange (101) may combine the name of the financial institutions and the type of accounts to generate aliases for the account information.

In some embodiment, the user may define the aliases for the account information by supplying the aliases with the account information (121) for association with the phone number (123).

Figure 13:
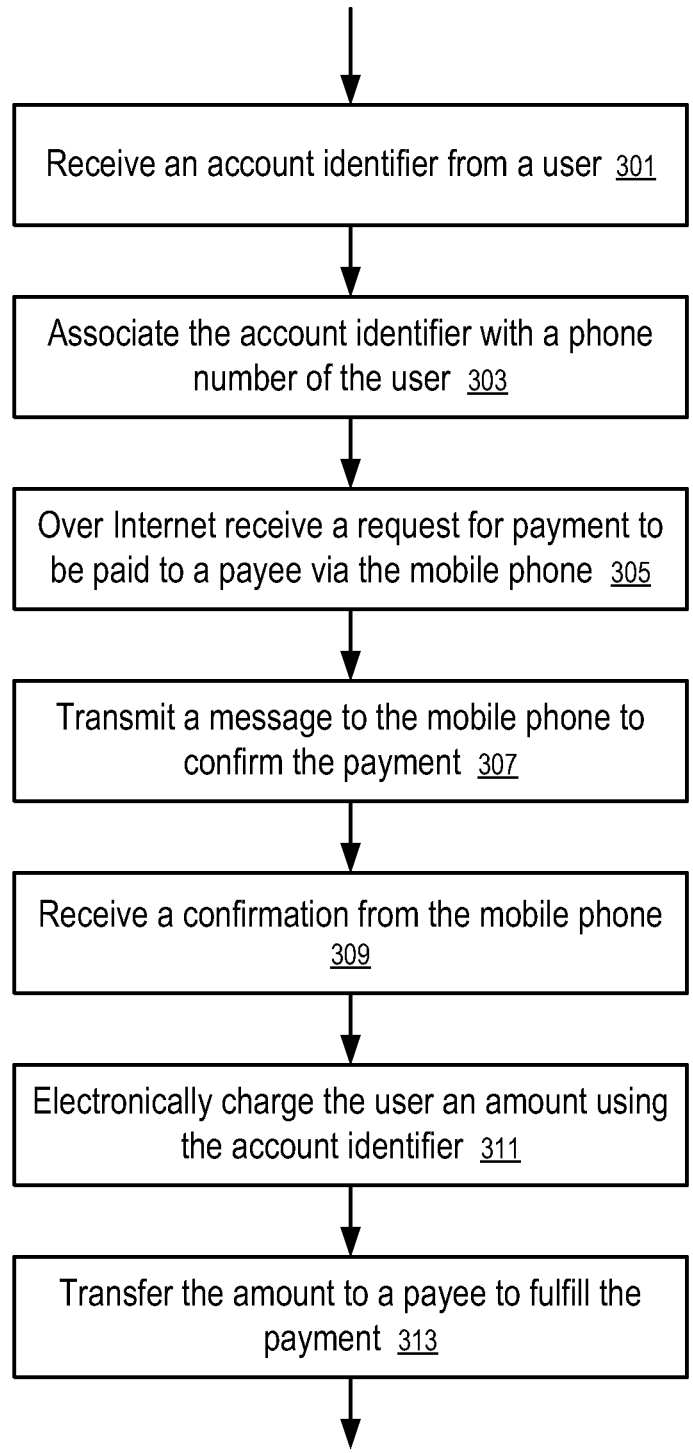
FIG. 13 shows a method to process an online payment according to one embodiment.

FIG. 13 shows a method to process an online payment according to one embodiment. In FIG. 13, the interchange (101) receives (301) an account identifier (e.g., 121) from a user and associates (303) the account identifier with a phone number (123) of the user in the data storage facility (107). Over the Internet the interchange (101) subsequently receives (305) a request for payment to be paid to a payee via the mobile phone (117) identified by the phone number (123). In response to the request, the interchange (101) transmits (307) a message (217) to the mobile phone (117) to confirm the payment.

After receiving (309) a confirmation or approval from the mobile phone (117) for the payment, the interchange (101) electronically charges (311) the user an amount using the account identifier (e.g., via communicating with the account server (125) using the account identifier). The interchange (101) then transfers (313) the amount to a payee to fulfill the payment.

Figure 14:
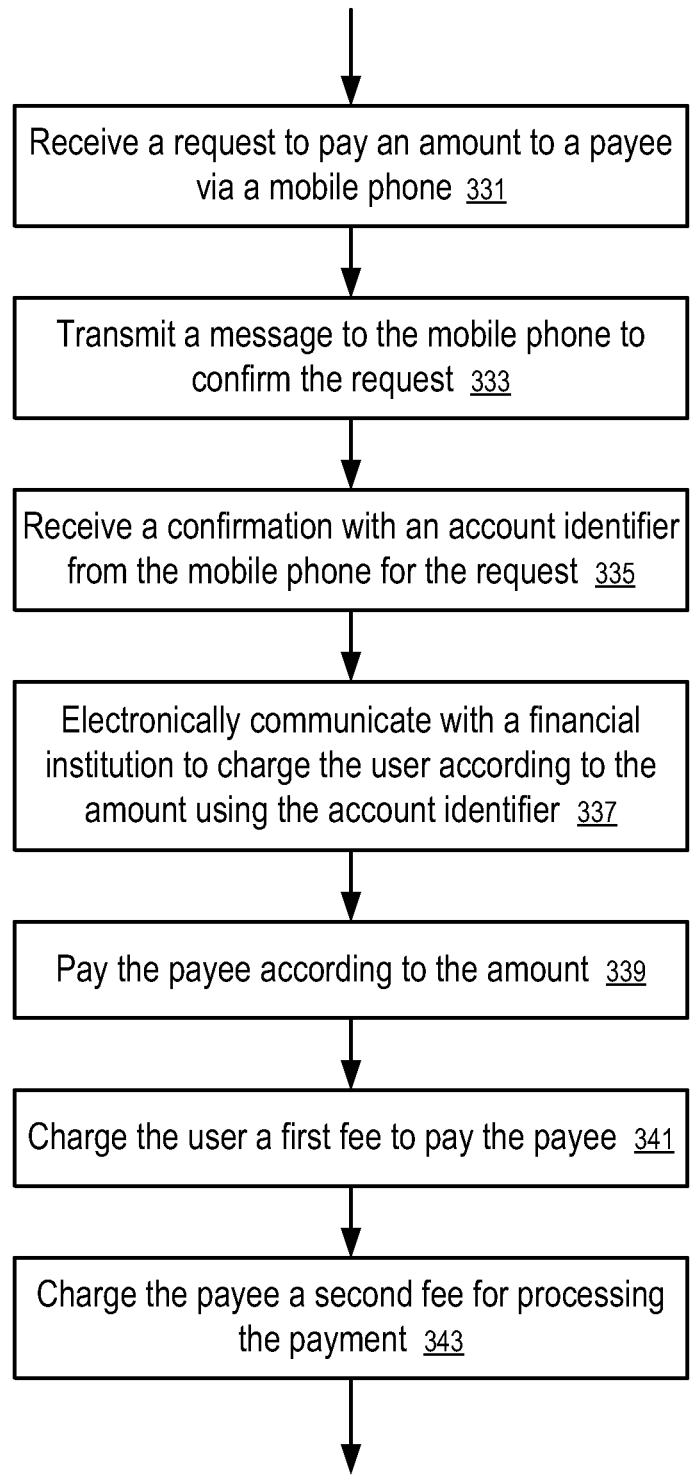
FIG. 14 shows another method to facilitate a payment transaction according to one embodiment.

FIG. 14 shows another method to facilitate a payment transaction according to one embodiment. In FIG. 14, the interchange (101) receives (331) a request to pay an amount to a payee via a mobile phone (117). The interchange (101) transmits (333) a message (217) to the mobile phone (117) to confirm the request via the converter (131) corresponding to the controller (115) of the mobile phone (117).

After the interchange (101) receives (335) a confirmation with an account identifier (e.g., 121) from the mobile phone (117) for the request, the interchange (101) electronically communicates (337) with a financial institution to charge the user the specified amount using the account identifier. The interchange (101) pays (339) the payee according to the amount, optionally charges (341) the user a first fee to pay the payee, and optionally charges (343) the payee a second fee for processing the payment.

In one embodiment, the users are given an incentive to provide the account information (121) for electronic payments via the account servers (125). For example, the interchange (101) may charge a lower fee for fulfilling payment requests via the account server (125) than for fulfilling payments requests via the phone bill. For example, the interchange (101) may offer rebates, discounts, etc. to the users who provide the account information (121). In some embodiments, the interchange (101) can complete a payment process via the account server (125) with fewer restrictions than via the phone bill.

In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., fees charged by the telecommunication carrier for collecting the funds via the mobile phone bill associated with the telephone number and/or the fees charged by the interchange (101) for processing the payments). Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, a personal identification number (PIN) is used in the confirmation of a transaction. The PIN may be stored in the user account hosted on the data storage facility (107) of the interchange (101), and be associated with the phone number (123) and/or the account information (121). For example, a user requesting a transaction using the funds associated with the phone number (123) may be required by the interchange (101) to present the correct PIN associated with the phone number (123).

In some embodiments, the PIN may be the same as a PIN used by a third party to control access to products and/or services for the user having the phone number (123). For example, the PIN for accessing the voice mail of the phone number (123) can be used by the interchange (101) to verify the identity of the user who attempts to use the funds associated with the phone number (123). For example, the interchange (101) may receive a PIN from the user and communicate with a telecommunication carrier of the phone number (123) to verify whether the received PIN is a correct PIN for accessing the voice mail of the phone number (123).

In some embodiments, a correct PIN is stored on the mobile phone (117) to control access to the services of the interchange (101). For example, an application running on the mobile phone (117) may prompt the user to provide a PIN and check the PIN received from the user against the correct PIN stored on the mobile phone (117) to determine whether the user is authorized to use the mobile phone (117) to access the services of the interchange (101). In some embodiments, the PIN is specific for the control of access to the services of the interchange (101). Without the PIN, the user may use other functions of the mobile phone (117), such as making phone calls, sending emails or text messages, etc. When it is determined that the user is authorized to use services of the interchange (101) via the mobile phone (117), the application allows the user to send a confirmation message to the interchange (101) to confirm a transaction, or to display a code received from the interchange (101) for the confirmation of the transaction via presenting the code in a web page of the interchange (101).

In some embodiments, the interchange (101) requires the user to provide the PIN associated with the phone number (123) via the mobile phone (117) at the phone number (123) to confirm a transaction. The user may provide the PIN to the mobile phone (117) which transmits the received PIN to the interchange (101) for verification. The user may provide the PIN in response to a message from the interchange (101) to the mobile phone (117) at the phone number (123), or in response to the interchange (101) presenting a request on the user terminal (111) to request the user to send to the interchange (101) a confirmation message from the mobile phone (117) at the phone number (123). Alternatively, the user may provide the correct PIN in the user terminal (111) to obtain a confirmation code, which is to be transmitted from the mobile phone (117) at the phone number (123) to confirm the transaction.

In some embodiments, the user may provide the correct combination of the PIN and the phone number (123) to the user terminal (111) to request a transaction, without the need to further confirm the request via the mobile phone (117).

In one embodiment, to further improve security, the communications from the mobile phone (117) at the phone number (123) further include an identification number stored on the mobile phone (117) (e.g., in an integrated circuit (IC) chip). For example, a software program (e.g., a Java application) can be used to read a hardware identification number from the IC chip of the mobile phone (117) and transmit a confirmation message including the hardware identification to indicate that the message is indeed from a mobile phone (117) registered with the user.

In one embodiment, the International Mobile Equipment Identity (IMEI) of the mobile phone (117) is used as the hardware identification number. Alternatively, a hardware identification number may be assigned to and stored into the mobile phone (117) when the mobile phone (117) is initially configured for the services of the interchange (101) (e.g., when the application is installed on the mobile phone (117)).

In one embodiment, when the mobile phone (117) at the phone number (123) is registered for the services of the interchange (101), a software application is installed and/or configured on the mobile phone (117). The software application can be implemented using Java programming language in one embodiment. Other programming languages can also be used. Further, in some embodiments, the application can be implemented via hardware circuits, such as Application-Specific Integrated Circuit (ASIC) or Field-Programmable Gate Array (FPGA), or a combination of special purpose hardware circuits and instructions.

Figure 15:
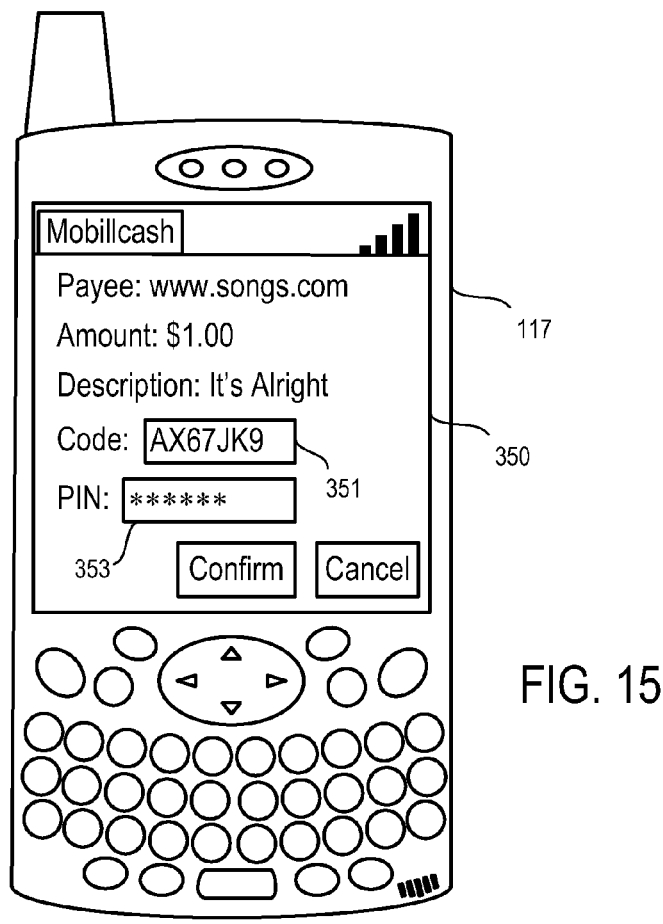
FIG. 15 illustrates a user interface to confirm a transaction according to one embodiment.

In one embodiment, the application is configured on the mobile phone (117) to present a user interface (350) to confirm a transaction according to one embodiment, as illustrated in FIG. 15. In FIG. 15, the application communicates with the interchange (101) to present information that identifies aspects of the transaction, such as the payee, the amount involved in the transaction, a description of the product or service in the transaction, etc.

In FIG. 15, the user interface (350) includes an entry box (353) to receive a PIN from the user. When the PIN received in the user interface (350) is invalid, the user interface (350) may reject the input and prevent the user from sending the confirmation message via the user interface (350).

Alternatively, the user interface (350) may accept the user input without checking the input for validity and transmit the confirmation with the received PIN to the interchange (101). The interchange (101) then checks the received PIN for validity. If the interchange (101) determines that the received PIN is valid for the phone number (123) of the mobile phone (117), the interchange (101) accepts the confirmation and performs the requested transaction. If the interchange (101) determines that the received PIN is invalid, the user interface (350) may prompt the user to re-enter the PIN.

In some embodiments, the user interface (350) and/or the interchange (101) may prevent the user from using the user interface (350) after the user fails to provide the correct PIN after a predetermined number of attempts.

In FIG. 15, the user interface (350) further includes an entry box for the user to enter a code (351) that represents the transaction. For example, when the user uses the user terminal (111) to submit a transaction request (e.g., via a web browser), the interchange (101) provides the code (351) as an identifier of the transaction.

In one embodiment, after the user enters the code (351) in the entry box, the application running the user interface (350) communicates with the interchange (101) to obtain the information about the transaction, such as the payee, the amount of the transaction, a description, etc. Thus, providing the code (351) in the entry box allows the user to see in the user interface (350) the information specific to the transaction for the confirmation of the correct transaction.

In one embodiment, the code (351) is a one-time code, which expires after the code is submitted to the interchange (101). To improve security, the interchange (101) may cause the one-time code (351) to expire after a predetermined period of time from when the one-time code (351) is provided by the interchange (101) to the user. When the one-time code (351) or the PIN is incorrect, the interchange (101) rejects the confirmation. After an incorrect combination of the PIN and the one-time code (351) is received, the interchange (101) may cause the one-time code (351) to expire; and the user is prompted to resubmit the transaction request to obtain a new one-time code.

In some embodiments, the interchange (101) may allow the user interface (350) to resubmit the input for the PIN a number of times if the one-time code (351) is valid. For example, the user interface (350) may be presented in response to a message from the interchange (101) requesting the confirmation of the transaction. The one-time code (351) is required in the entry box to ensure that the user has knowledge about the transaction submitted via the user terminal (111). The PIN is required in the entry box (353) to ensure that the user is authorized. In some embodiments, the one-time code (351) is optional.

In some embodiments, the interchange (101) provides the one-time code (351) to the user via the user interface (350). The application may send the one-time code (351) back to the interchange (101) to identify the transaction being confirmed by the user.

Alternatively, the interchange (101) may require the user to provide the one-time code (351) back to the interchange (101) via the user terminal (111) that submits the corresponding transaction request. After the one-time code (351) shown in the user interface (350) on the mobile device (117) is transmitted from the user terminal (111) to the web server of the interchange (101), the transaction is confirmed with the interchange (101).

In one embodiment, the PIN is used to protect access to the one-time code (351). The user interface (350) is configured to display the one-time code (351) after the user enters the correct PIN in the entry box (353). If the user fails to enter the correct PIN in the entry box (353), the user interface (350) does not display the one-time code (351) which is required in the user terminal (111) to confirm the transaction.

In one embodiment, the code (351) is a one-time password, which is generated on the mobile phone (117). The one-time password is provided to the interchange (101) to confirm the transaction (e.g., via the mobile phone (117) communicating with the interchange (101), or via the user terminal (111) communicating with the interchange (101)).

In one embodiment, the one-time password is generated on the mobile phone (117) after the request for the transaction is submitted to the interchange (101) via the user terminal (111). The one-time password is not received in the mobile phone (117) from the interchange (101) as a result of the transaction request. In one embodiment, the one-time password is generated based at least in part on a seed that is configured in the mobile phone prior to the transaction.

In one embodiment, the one-time password is generated on the mobile phone (117) after the PIN is verified in the entry box (353). If the PIN entered in the entry box (353) is invalid, the mobile phone (117) does not generate the one-time password.

In one embodiment, the user is instructed to use the one-time password to authenticate with the interchange (101), using the user terminal (111) that submits the request for the transaction. Alternatively, the mobile phone (117) may transmit the one-time password to confirm the transaction. In some embodiments, the mobile application generates the one-time password and transmits the one-time password to the interchange (101) to confirm the transaction, without displaying the one-time password to the user, after the user enters the correct PIN.

In one embodiment, the correct PIN is stored on the mobile phone (117) (e.g., in an encrypted format). Thus, the user interface (350) can verify the PIN entered in the entry box (353) without communicating with the interchange (101).

Alternatively, the correct PIN may be stored on the data storage facility (107) of the interchange (101). The application running on the mobile phone (117) communicates the PIN received in the entry box (353) to the interchange (101) (e.g., in an encrypted format) for verification.

Alternatively, a third party may store the correct PIN (e.g., for controlling access to the voice mail of the phone number (123)). After the interchange (101) obtains the PIN received in the entry box (353), the interchange (101) communicates with the third party to verify the PIN.

Figure 16:
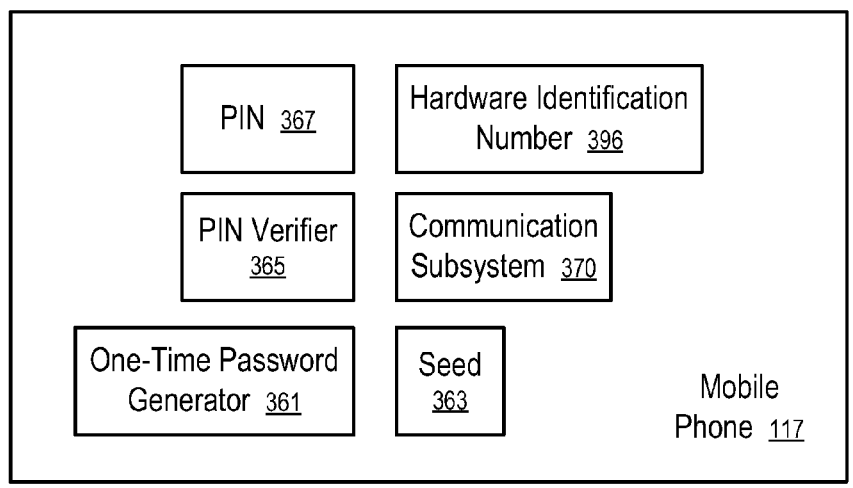
FIG. 16 illustrates a mobile phone configured to confirm transactions according to one embodiment.

FIG. 16 illustrates a mobile phone configured to confirm transactions according to one embodiment. In FIG. 16, the mobile phone (117) includes a hardware identification number (396) which identifies the mobile phone (117). In one embodiment, the hardware identification number (396) is configured and stored on the mobile phone (117) prior to the mobile phone (117) being distributed to end users. For example, the hardware identification number (396) may include International Mobile Equipment Identity (IMEI) and/or Media Access Control address (MAC address).

In some embodiments, the hardware identification number (396) includes a number that is assigned to the mobile phone (117) when the mobile phone (117) is registered with the interchange (101) for the services provided by the interchange (101). For example, the interchange may use an application to write the assigned number into an integrated circuit (IC) chip in the mobile phone to identify the mobile phone (117). In some embodiments, the assigned number is written into a removable memory module to represent the registered mobile phone (117).

In FIG. 16, the mobile phone (117) includes a seed (363) for the one-time password generator (361). The one-time password generator (361) is configured to generate a series of passwords for authenticating with the interchange (101), based on the seed (363) and/or the current time. Thus, the one-time password generated on the mobile phone (117) is in synchronization with the corresponding one-time password generated or used on the interchange (101). Alternatively, the one-time password generator (361) may not rely upon the current date and time for synchronization; and the interchange (101) is configured to tolerate skipping of up to a predetermined number of one-time passwords to accept a one-time password from the mobile phone (117).

In one embodiment, the PIN verifier (365) is configured to check the PIN received in the entry box (353) against the PIN (367) stored on the mobile phone (117). After the PIN verifier (365) determines that there is a match between the PIN (367) stored on the mobile phone (117) and the PIN received in the entry box (353), the communication subsystem (37) transmits a one-time password obtained from the one-time password generator (361) and the hardware identification number (396) to the interchange (101) to confirm the transaction. In one embodiment, the one-time password is used to encrypt the confirmation transmitted from the mobile phone (117) to the interchange (101) to confirm the transaction.

The mobile phone (117) may transmit the confirmation message to the interchange (101) via short message service (SMS), email, a WAP request, or a web request. Other communication protocols can also be used.

Figure 17:
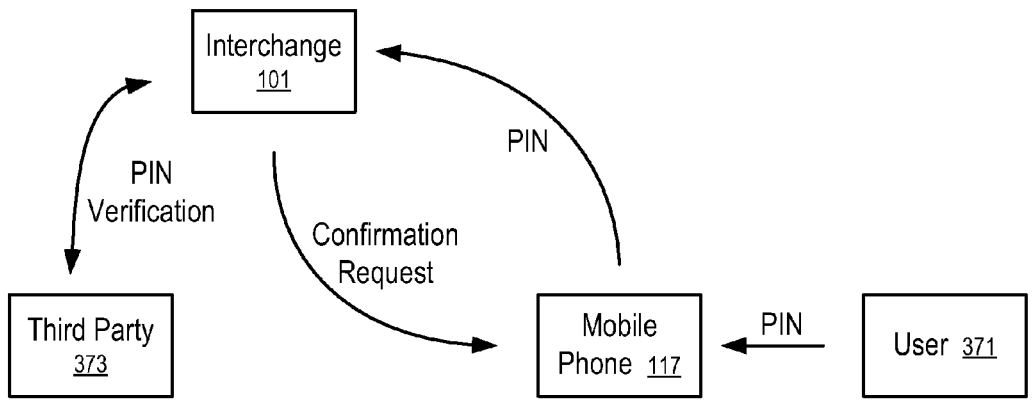
FIGS. 17-19 illustrate methods to confirm transactions according to one embodiment.
Figure 18:
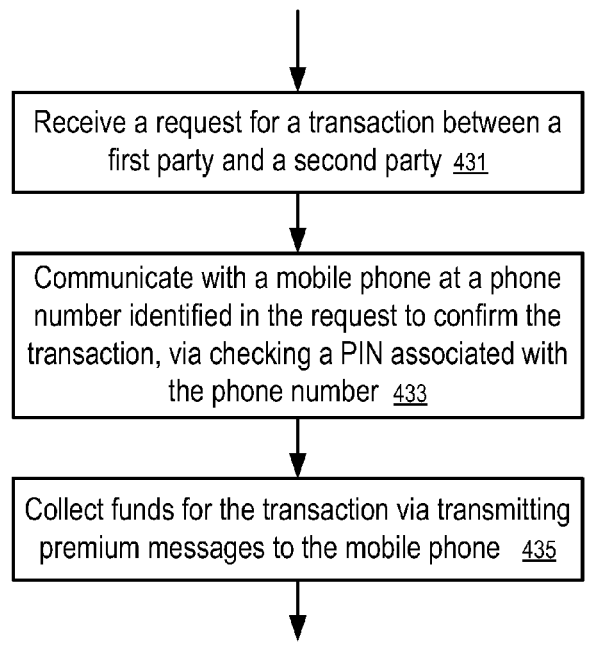
Figure 19:
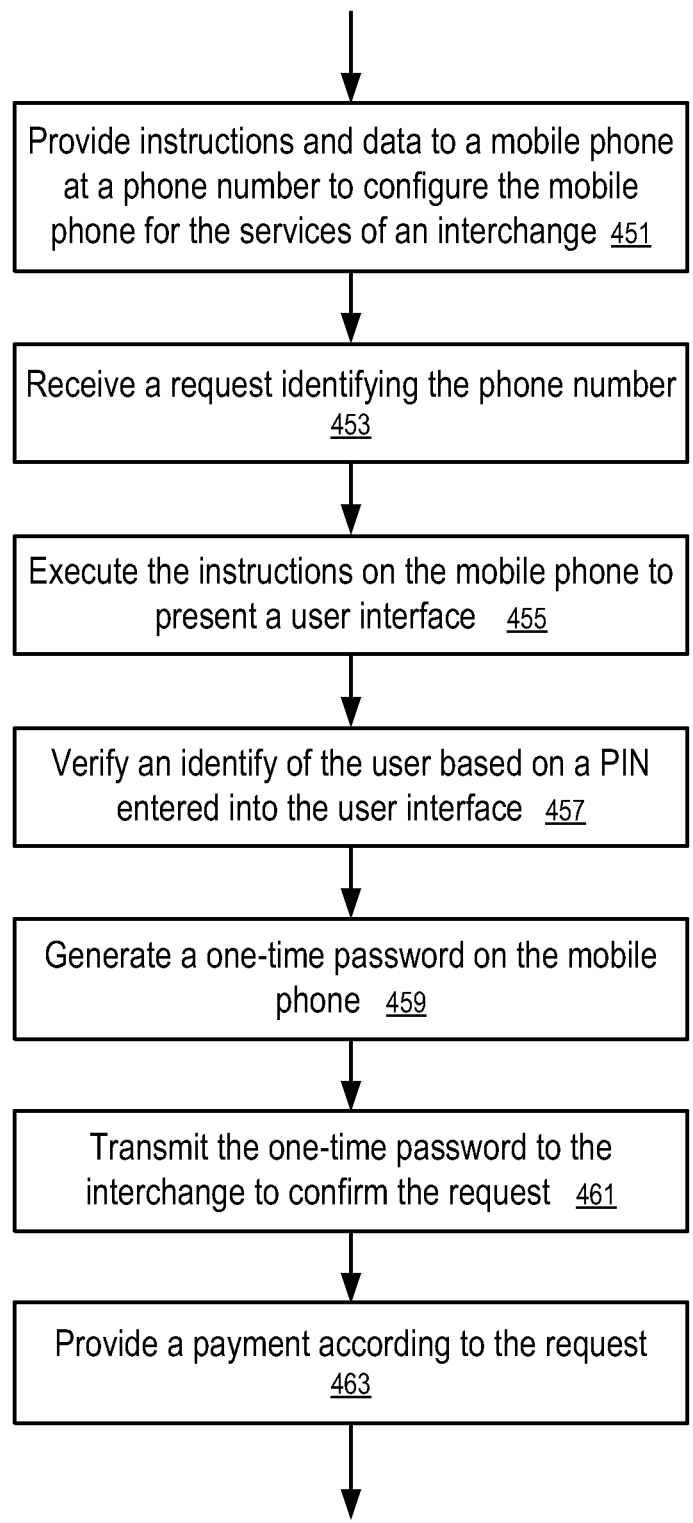

FIGS. 17-19 illustrate methods to confirm transactions according to one embodiment.

In FIG. 17, neither the interchange (101) nor the mobile phone (117) stores the correct PIN associated with the phone number of the mobile phone (117). A third party (373) stores the correct PIN associated with the phone number (123) of the mobile phone (117). To confirm a transaction, the interchange (101) transmits a message to the mobile phone (117) at the phone number (123) to request a confirmation message from the mobile phone (117). The mobile phone (117) presents a user interface (e.g., 350) to receive an input for the PIN from the user (371) and transmits the received PIN to the interchange (101), which further communicates with the third party (373) to verify whether the received PIN matches the correct PIN. Thus, the user may use the same PIN for multiple services associated with the phone number (123), such as accessing voice mail at the phone number (123) and paying for purchases using funds associated with the phone number (123).

In FIG. 18, after a request for a transaction between a first party and a second party (431) is received in the interchange (101) (e.g., via a web server), the interchange (101) communicates (433) with the mobile phone (117) at a phone number (123) identified in the request to confirm the transaction, via checking a PIN associated with the phone number (123). The transaction is confirmed if a PIN entered into the mobile phone (117) by the user of the mobile phone (117) is correct. After the transaction is confirmed, the interchange (101) collects (435) funds for the transaction via transmitting premium messages to the mobile phone (117).

In FIG. 19, the interchange (101) provides (451) instructions and data to a mobile phone (117) at a phone number (123) to configure the mobile phone (117) for the services of the interchange (101). The instructions may be in Java programming language, or other programming languages. The data may include a seed (363) for the one-time password generator (361) and/or a portion of the hardware identification number (396). For example, the user may use the mobile phone (117) to download the instructions and data from the interchange (101).

After the mobile phone (117) is configured via the instructions and data, the interchange (101) may receive (453) a request identifying the phone number (123) and transmit a message to the user (371) to cause the mobile phone (117) to execute (455) the instructions on the mobile phone (117) to present a user interface (350). After the identify of the user (371) is verified (457) based on a PIN entered into the user interface (350), the mobile phone (117) generates (459) a one-time password on the mobile phone (117) and transmits (461) the one-time password to the interchange (101) to confirm the request. Once the request is confirmed via the confirmation transmitted from the mobile phone (117), the interchange (101) provides (463) a payment according to the request (e.g., using funds associated with the phone number (123)).

In one embodiment, the interchange (101) includes a server computer. The server computer may be used to receive a request for a transaction between a first party and a second party. The request includes the indication of a phone number of the first party and an amount to be paid to the second party.

In response to the request, the server computer communicates with a mobile phone (117) at the phone number (123) to confirm, via a personal identification number of the first party, the transaction. After the transaction is confirmed via the personal identification number of the first party, the server computer transmits one or more premium messages to the mobile phone (117) to collect, via a telecommunication carrier of the mobile phone (117), funds in accordance with the amount to be paid to the second party.

In one embodiment, the interchange (101) provides instructions to the mobile phone (117). When executed, the instructions cause the mobile phone (117) to present a user interface to receive a first personal identification number.

The instructions may further cause the mobile phone (117) to encrypt the first personal identification number for transmission from the mobile phone (117) to the server computer. The server computer is to compare the first personal identification number with a second personal identification number associated with the phone number (123) of the mobile phone (117) to determine whether the transaction is confirmed.

Alternatively, the instructions may further cause the mobile phone (117) to compare the first personal identification number with a second personal identification number stored on the mobile phone (117) to determine whether the first personal identification number is correct. After determining that the first personal identification number is correct, the instructions further cause the mobile phone (117) to transmit a message to the server computer to confirm the transaction.

In one embodiment, the instructions further cause the message to include a hardware identification code of the mobile phone (117). The hardware identification code may be provided to the mobile phone (117) in a read-only memory, before the mobile phone (117) is distributed to an end user. For example, the hardware identification code may include International Mobile Equipment Identity (IMEI).

In some embodiments, the hardware identification code is provided to the mobile phone (117) when the mobile phone (117) is registered with the server computer for services offered by the server computer.

In one embodiment, the instructions further cause the mobile phone (117) to transmit the message to the server computer via short message service (SMS). In some embodiments, the message includes a one-time password generated via the instructions. For example, the one-time password can be generated based on a current time; and the server computer is to determine whether the one-time password is generated by the mobile phone (117). When the one-time password matches a series of passwords configured to be generated by the mobile phone (117), the one-time password is accepted. In one embodiment, the server computer provides to the mobile phone (117) at the phone number (123), a seed for generation of the one-time password, which is used by the instructions to generate the one-time password.

In one embodiment, the server computer provides the first party with a seed for one-time password generation when the first party registers for services of the server computer; and the instructions cause the mobile phone (117) to present a user interface to receive the seed.

In one embodiment, the server computer is to further communicate with a third party to determine whether the first personal identification number received in the user interface is associated with the phone number (123) of the mobile phone (117). For example, the third party may be a telecommunication carrier of the mobile phone (117); and a correct personal identification number is used by the telecommunication carrier to control access to voice mails for the phone number (123).

In one embodiment, the request is received in a web server of the server computer; the server computer communicates with the mobile phone (117) to provide a one-time code to the mobile phone (117), after the personal identification number of the first party is verified via the mobile phone (117); and the server computer is configured to receive the one-time code back in the web server to confirm the transaction.

In one embodiment, the request is received in a web server of the server computer; the server computer provides a one-time code via the web server to the first party; and the server computer is configured to determine whether the transaction is confirmed based on receiving, from the mobile phone (117), both the personal identification number of the first party and the one-time code.

In one embodiment, the interchange (101) uses location information and/or other personal identification information to improve security for the payment processing system.

For example, in one embodiment, the interchange (101) may add to a "score" as to whether a transaction is valid, based on the registered location of the mobile phone (117), such as the billing address of the mobile phone (117) obtained by the interchange (101) from the telecommunication carrier of the mobile phone (117). When the transaction occurs outside a certain geographic region relative to the registered location (e.g., stretching from the house at the billing address to the corresponding city or county), the transaction may be considered invalid.

In one embodiment, the interchange (101) may determine whether the location of the user terminal (111) used to make or submit the payment request is geographically close to the mobile phone (117), before consummating the payment. For example, when the location of the user terminal (111) is determined to be far away from the location of the mobile phone (117), the score for the transaction may be determined to be higher than a threshold; and thus the request for the transaction can be identified as fraudulent. The location of the user terminal (111) may be determined based on the IP address of the user terminal and/or based on the service of a third party (e.g., The $41^{st}$ Parameter Inc.). The location of the mobile phone (117) may be determined by the mobile phone (117) (e.g., via a GPS receiver in the mobile phone) and/or the telecommunication carrier of the mobile phone (117) (e.g., based the location of a base station that is in communication with the mobile phone (117)).

In some embodiments, the merchant server (113) provides the interchange (101) with the location of the user of the user terminal (111) (e.g., based on user registration data at the merchant server (113)). In some embodiments, the telecommunication carrier of the mobile phone (117) provides the interchange (101) with the location of the mobile phone (117) (e.g., the billing address of the user and/or the current location of the mobile phone (117)).

In some embodiments, the interchange (101) stores historical location information for past transactions, including the locations of the user terminal (111) and/or the locations of the mobile phone (117), and compares the current location information with the historical location information to determine the risk score for the current payment request. In some embodiments, the historical location information is stored in association with the Mobile Station International Subscriber Directory Number (MSISDN) of the mobile phone (117). In some embodiments, the interchange (101) may further obtain location information related to mobile phone (117) from social networking websites, such as Facebook®, in an automated way.

In one embodiment, the interchange (101) is configured to use "consistency" of personal identification information to determine the risk score for the current payment request. For example, the personal identification information can be information that is personally identifiable with the user and may be obtained from a trusted source (e.g., a third party for identifying the locations of user terminals (111), a telecommunication carrier of the mobile phone (117), the merchant servers (113)), such as location information. The interchange (101) may communicate with the trusted source to obtain the personal identification information via an Application Programming Interface (API).

Alternatively, the interchange (101) may ask the user to verify the personal identification information via an SMS message to validate the transaction. For example, when the user makes a purchase at the merchant server (113) and chooses to make the payment via the mobile phone (117) of the user, the interchange (101) sends a text message to the user to request the user to reply with the personal identification information, such as the zip code of the billing address of the mobile phone (117) (or the last four digits of the social security number of the user, the first four digits of the street address of the user, a PIN of the user with the telecommunication carrier of the mobile phone (117), etc.) The interchange (101) may query the telecommunication carrier as to whether the reply from the user matches the corresponding data the telecommunication carrier stores for the mobile phone (117). In one embodiment, after the user enters the correct personal identification information (e.g., zip code, social security number, PIN) a predetermined number of times for one or more payment requests, the interchange (101) is configured to trust the mobile phone (117). For example, while the mobile phone (117) is within the area in which the correct personal identification information was entered, the mobile phone (117) is used to pay the same merchant, and/or the current payment request is within a predetermined time period from when the correct personal identification information was previously provided via the mobile phone, the interchange (101) may bypass the request for the user to enter the personal identification information, even though the mobile phone (117) is outside an area from the billing address of the mobile phone, or far away from the user terminal (111) that makes the payment request. In some embodiments, the interchange (101) may bypass the requirement to enter the personal identification information based on the identity of the merchant and/or the price or amount of the payment request. In one embodiment, the interchange (101) may bypass the requirement to enter the personal identification information, if the location of the mobile phone (117) is determined to be within a predetermined trusted area (e.g., near the billing address, within a commercial district of a previous purchase that occurred within a predetermined period of time, etc.) In one embodiment, the interchange (101) uses the location of the user terminal (111) and/or the location of the mobile phone (117) recorded for the previous payment transactions (e.g., transactions confirmed via verifying the personal identification information) to expand the locations the interchange (101) may trust for subsequent payment requests related to the mobile phone (117). In one embodiment, after a threshold period of time has passed since a previous transaction, the interchange (101) removes the location of the previous transaction from the trusted listed and thus may reduce the trusted area. When the payment request is within the trusted geographical area for the mobile phone (117), the interchange (101) may bypass the request for the personal identification information for the verification of the identity of the requester. In some embodiments, the trusted areas are determined based on a set of transactions that occurred within a period of time from the current payment request. Similarly, the patterns in previous distances between the user terminal (111) and the mobile (117) and/or the timing of the requests can be used to establish customized, trusted distance threshold and/or payment timing related to the mobile phone (117). When a payment request is outside the trusted space and time relations, the interchange (101) may request the user to enter the personal identification information via the user terminal (111) and/or the mobile phone (107) to authorize the transaction.

In some embodiments, the interchange (101) asks the user to use the user terminal (111) to verify the personal identification information, before the interchange (101) communicates with the mobile phone (117) for the confirmation of the payment request. For example, the interchange (101) may request the user to specify, via the user terminal (111), the PIN of the user of the mobile phone (117) to access voice mails maintained by the telecommunications carrier for the mobile phone (117) (or other personal identification information). After obtaining the personal identification information from the user terminal (111), the interchange (101) queries the telecommunication carrier of the mobile phone (117) to determine whether the information provided by the user using the user terminal (111) is correct. If the information received from the user terminal (111) is not correct, the interchange (101) does not accept the payment request.

Figure 20:
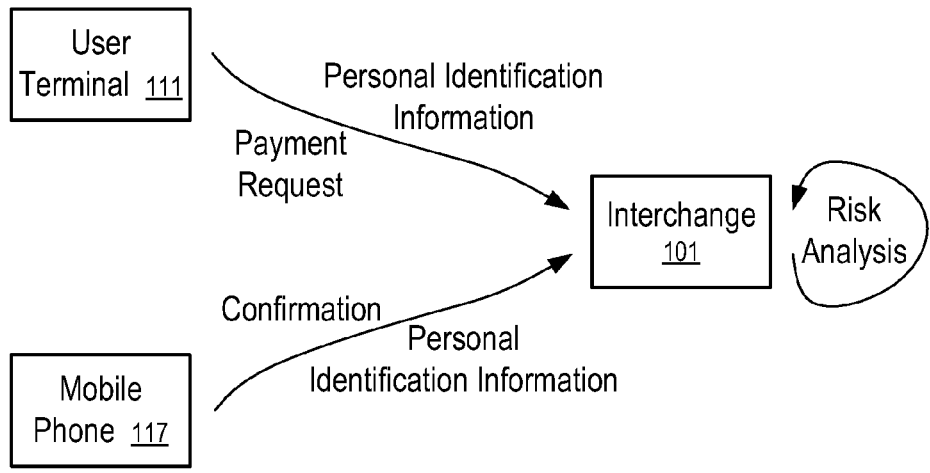
FIG. 20 shows a system to perform risk analysis according to one embodiment.

FIG. 20 shows a system to perform risk analysis according to one embodiment. In FIG. 20, the interchange (101) performs risk analysis using personal identification information obtained separately via the user terminal (111) and the mobile phone (117).

In one embodiment, the user terminal (111) and the mobile phone (117) are distinct and separate from each other. The user terminal (111) is used to submit the payment request, which identifies the mobile phone (117) as a way to make the payment. The mobile phone (117) is used to provide confirmation of the payment request. After the payment request is confirmed via the mobile phone (117) and after the interchange (101) determines that the risk related to the payment request is below a threshold (e.g., determined based on a distance between the personal identification information associated with the user terminal (111) and the personal identification information associated with the mobile phone (117)), the interchange (101) uses funds associated with the mobile phone (117) to fulfill the payment request.

For example, the interchange (101) may send premium messages to the mobile phone (117) to collect funds for the payment request via the telecommunication carrier of the mobile phone (117), request the user to send premium messages to the interchange (101) to provide the funds, request the telecommunication carrier of the mobile phone (117) to bill the user on behalf of the interchange (101) using the phone bill of the mobile phone (117), or charge a credit card (or debit card or bank card) of the user stored with the phone number (123) of the mobile phone (117) in the data storage facility (107).

In one embodiment, the interchange (101) derives the personal identification information associated with the user terminal (111) based on the payment request received from the user terminal (111). For example, in one embodiment, the payment request includes an identifier of the user terminal (111), such as an IP address, or a name of the user used to access the service of the merchant server (113); and the interchange (101) uses the identifier to derive the personal identification information, such as the geographical location of the user, with or without the help from a third party.

For example, the interchange (101) may use the IP address to look up the geographical location of the user from an Internet service provider, or a third party that provides a service to map an IP address to a geographical location.

For example, the interchange (101) may use the name of the user used to access the service of the merchant server (113) to query for the location of the user registered with the merchant server (113). For example, the interchange (101) may use a social networking website to obtain location information about the user in an automated way through an application programming interface of the social networking website.

In some embodiments, the interchange (101) prompts the user of the user terminal (111) to specify the personal identification information as part of the payment request.

Similarly, the interchange (101) may obtain the personal identification information associated with the mobile phone (117) using various different methods.

For example, in one embodiment, the interchange (101) prompts the user of the mobile phone (117) to provide the personal identification information as part of the payment request. In some embodiments, the mobile phone (117) is configured to run a mobile application to communicate with the interchange (101); and the mobile application is configured to automatically provide the personal identification information, such as the current location of the mobile phone (117) as determined by a GPS receiver of the mobile phone (117), to the interchange (101) with the confirmation message.

Alternatively, the interchange (101) may derive the personal identification from the communication for the confirmation, or query the telecommunication carrier of the mobile phone (117) prior to the confirmation.

For example, in one embodiment, the interchange (101) queries the telecommunication carrier of the mobile phone (117) for the current location of the mobile phone (117) (e.g., based on the location of the base station that is in wireless communication with the mobile phone (117)). For example, the interchange (101) may query a third party service provider for the verification of the current location of the mobile phone (117). For example, the interchange (101) may alternatively ask the telecommunication carrier (or the third party) to provide an estimated distance between the user terminal (111) and the mobile phone (117), or ask the telecommunication carrier (or the third party) to determine whether the mobile phone (117) is within a predetermined region from the location of the user terminal (111), such as whether the mobile phone (117) is within a predetermined distance from an estimated location of the user terminal (111), or whether the mobile phone (117) is within the same city or state of the estimated location of the user terminal (111), etc.

In one embodiment, the interchange (101) determines the magnitude of the mismatch between the personal identification information associated with the user terminal (111) and the corresponding personal identification information associated with the mobile phone (117) to determine the level of risk that the payment request is fraudulent. For example, the level of risk may be proportional to the estimated distance between the user terminal (111) and the mobile phone (117). When the level of risk is above a threshold, the interchange (101) may reject the request, or request the user to provide further personal identification information, such as a PIN, a portion of a social security number of the user, etc. to lower the risk score.

Figure 21:
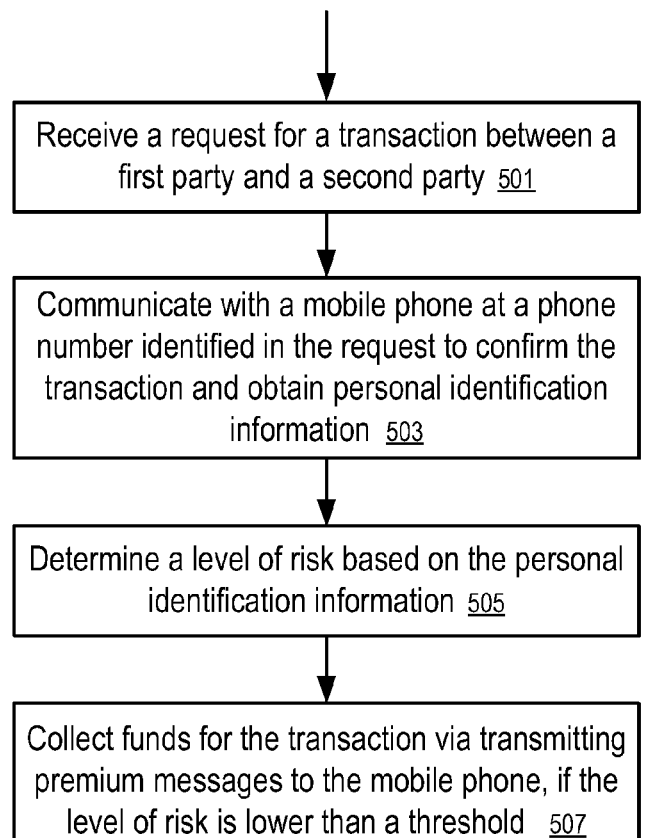
FIG. 21 shows a method to improve the security of payment transactions according to one embodiment.

FIG. 21 shows a method to improve the security of payment transactions according to one embodiment. In FIG. 21, the interchange (101) receives (501) a request for a transaction between a first party and a second party. The interchange (101) communicates (503) with a mobile phone (117), via a converter (131) corresponding to a controller (115) of the mobile phone (117), at a phone number (123) identified in the request to confirm the transaction and obtain personal identification information. The interchange (101) uses the common format processor (133) to determine (505) a level of risk based on the personal identification information. If the level of risk is lower than a threshold, the interchange (101) uses the converter (131) corresponding to the controller (115) of the mobile phone (117) to transmit premium messages to the mobile phone (117) to collect (507) funds for the transaction.

Figure 22:
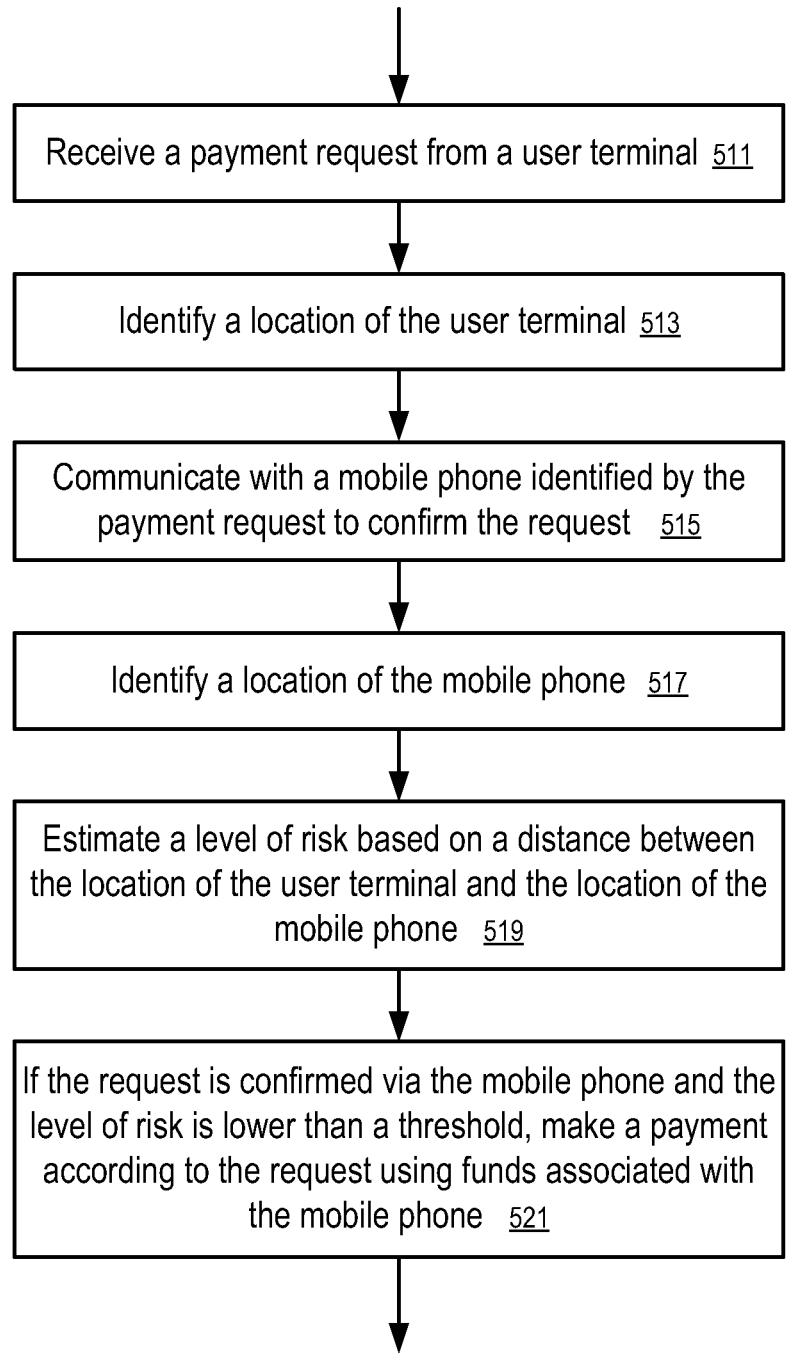
FIG. 22 shows another method to secure payment transactions according to one embodiment.

FIG. 22 shows another method to secure payment transactions according to one embodiment. In FIG. 22, the interchange (101) receives (511) a payment request from a user terminal (111). For example, in one embodiment, the user uses the user terminal (111) to make a purchase on a merchant server (113), which forwards or redirects the user terminal (111) to the interchange (101) to process the payment for the purchase.

In FIG. 22, the interchange (101) identifies (513) a location of the user terminal (111). For example, the interchange (101) may identify the location of the user based on a parameter embedded in the payment request forwarded or redirected from the merchant server (113). The merchant server (113) may determine a location of the user terminal (111) and provide the location to the interchange (101). For example, the merchant server (113) may determine the location based on user registration information, or based on a location service provided by a third party.

Alternatively, the interchange (101) may determine the location of the user without the help of the merchant server (113). For example, the interchange (101) may look up the location of the user terminal (111) based on the IP address of the user terminal (111).

In some embodiments, the user is prompted by the interchange (101) to provide the location of the user terminal (111) to complete the payment request.

In FIG. 22, the interchange (101) communicates (515) with a mobile phone (117), identified by the payment request, to confirm the request.

In one embodiment, the interchange (101) further identifies (517) a location of the mobile phone (117) to estimate (519) a level of risk in the transaction based on a distance between the location of the user terminal (111) and the location of the mobile phone (117).

For example, the interchange (101) may obtain the location of the mobile phone (117) determined by a GPS receiver in the mobile phone (117). In one embodiment, the mobile phone (117) is configured to transmit the location determined by the GPS receiver with the confirmation message from the mobile phone (117) to the interchange (101).

Alternatively, the interchange (101) may query the controller (115) of the mobile phone (117) for the location of the mobile phone (117). For example, after identifying the phone number (123) for the transaction, the interchange (101) queries the controller (115) for the location information of the mobile phone (117) using the phone number (123), before (or after) the interchange (101) communicates with the mobile phone (117) to confirm the transaction.

In some embodiments, the controller (115) is configured to supplement the confirmation message transmitted from the mobile phone (117) with an indication of the location of the mobile phone (117) (e.g., an identification of a base station that is in communication with the mobile phone (117)); and the interchange (101) uses the indication to estimate the location of the mobile phone (117).

In some embodiments, the interchange (101) prompts the user to specify the location of the mobile phone (117) in the confirmation message sent from the mobile phone (117) to confirm the payment request.

In FIG. 22, if the request is confirmed via the mobile phone (117) and the level of risk is determined to be lower than a threshold, the interchange (101) makes (521) a payment according to the request using funds associated with the mobile phone (117).

In some embodiments, the interchange (101) stores the locations of the user terminal (111) and the mobile phone (117) in association with the phone number (123). In processing subsequent payment requests for the phone number (123), the stored prior locations of the user terminal (111) and the mobile phone (117) can be used in the estimation of the level of risk. For example, when the location of the user terminal (111) and/or the location of the mobile phone (117) associated with the current payment request are/is far away from the stored locations, the level of risk is higher than if the locations are not far away from each other. In one embodiment, the greater the separation in the locations, the higher the estimated risk level.

Figure 23:
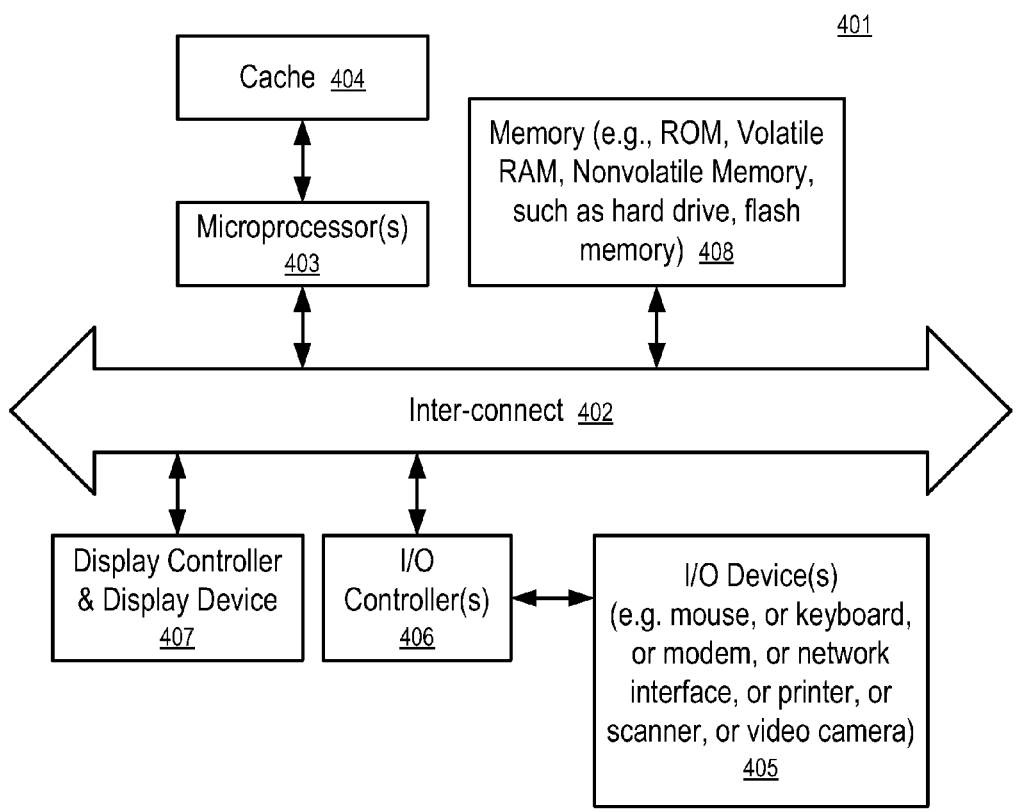
FIG. 23 shows a data processing system, which can be used in various embodiments.

FIG. 23 shows a data processing system, which can be used in various embodiments. While FIG. 23 illustrates various components of a computer system, it is not intended to represent any particular architecture or manner of interconnecting the components. Some embodiments may use other systems that have fewer or more components than those shown in FIG. 23.

In one embodiment, each of the interchange (101), the data storage facility (107), the controllers (115), the mobile phones (117), the user terminals (111), the account server (125) and the servers (113) can be implemented as a data processing system, with fewer or more components, as illustrated in FIG. 23.

In FIG. 23, the data processing system (401) includes an inter-connect (402) (e.g., bus and system core logic), which interconnects a microprocessor(s) (403) and memory (408). The microprocessor (403) is coupled to cache memory (404) in the example of FIG. 23.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:
   receiving in a server computer a request for a transaction between a first party and a second party, the request including an indication of a phone number of the first party and an amount to be paid to the second party;
   in response to the request, determining by the server computer a geographical location of a mobile phone at the phone number;
   determining, by the server computer, a value indicating a risk of the request being fraudulent, based at least in part on the location; and
   after the transaction is confirmed and if the risk as indicated by the value is below a threshold, transmitting by the server computer one or more messages to a telecommunication carrier of the mobile phone to collect, via the telecommunication carrier of the mobile phone, funds in accordance with the amount to be paid to the second party.

2. The method of claim 1, further comprising:
   storing first personal identification information of the first party; and
   storing second personal identification information as the location of the mobile phone as;
   wherein the value is determined based on comparing the first personal identification information and the second personal identification information.

3. The method of claim 2, wherein the first personal identification information is associated with a computer from which the request is received; the second personal identification information is associated with the mobile phone; and the computer and the mobile phone are distinct and separate from each other.

4. The method of claim 2, further comprising:
   communicating with the mobile phone at the phone number to confirm the request wherein the first personal identification information of the first party is stored before the request is received; and the location of the mobile phone is received during the communicating by the server computer with the mobile phone to confirm the transaction.

5. The method of claim 2, wherein the value is proportional to a distance between the first personal identification information and the location of the mobile phone.

6. The method of claim 2, further comprising:
   communicating with the mobile phone at the phone number to confirm the request wherein a level of risk is determined to be lower if the request is confirmed.

7. The method of claim 2, wherein the first personal identification information is an address of the first party.

8. The method of claim 7, wherein the address of the first party is a billing address of the phone number.

9. The method of claim 8, further comprising:
   receiving by the server computer the billing address from the telecommunication carrier of the mobile phone.

10. The method of claim 7, further comprising:
    obtaining by the server computer the address of the first party from a social networking website.

11. The method of claim 2, wherein the first personal identification information is a location of a computer from which the server computer receives the request.

12. The method of claim 2, wherein the first personal identification information is a location of the requester.

13. The method of claim 12, further comprising:
    receiving the location of the requester from the second party.

14. The method of claim 2, wherein the first personal identification information includes locations associated with prior transactions confirmed via the phone number.

15. The method of claim 14, wherein the locations comprise locations of computers used to make requests for the prior transactions and locations of the mobile phone at the phone number where confirmations for the prior transactions were made.

16. The method of claim 14, wherein the mobile phone is identified by a Mobile Station International Subscriber Directory Number (MSISDN), and the method further comprises:
    storing the locations in association with the MSISDN.

17. The method of claim 2, wherein the first personal identification information comprises one of: a zip code, a portion of a street address, a portion of a social security number, and a PIN.

18. The method of claim 17, wherein the second personal identification information is received from the mobile phone during the communicating by the server computer with the mobile phone to confirm the transaction.

19. A computer-readable storage media storing instructions, the instructions causing a computer to perform a method, the method comprising:
    receiving in a server computer a request for a transaction between a first party and a second party, the request including an indication of a phone number of the first party and an amount to be paid to the second party;
    in response to the request, determining by the server computer a geographical location of a mobile phone at the phone number;
    determining, by the server computer, a value indicating a risk of the request being fraudulent, based at least in part on the location; and
    after the transaction is confirmed and if the risk as indicated by the value is below a threshold, transmitting by the server computer one or more messages to a telecommunication carrier of the mobile phone to collect, via the telecommunication carrier of the mobile phone, funds in accordance with the amount to be paid to the second party.

20. A system, comprising:
    a data storage facility to store first personal identification information in association with a mobile phone number of a user; and
    an interchange coupled with the data storage facility, the interchange including a common format processor and a plurality of converters to interface with a plurality of controllers, the converters configured to communicate with the controllers in different formats, the converters to communicate with the common format processor in a common format, the common format processor to instruct a first controller of the controllers, via a first converter of the converters, to communicate with a mobile phone at the mobile phone number of the user to confirm a payment request and obtain a geographical location, the common format processor to determine a risk of the request being fraudulent based on at least in part on the location and, after the request is confirmed and when the risk is below a threshold, to communicate one or more messages to a telecommunication carrier of the mobile phone to collect, via the telecommunication carrier of the mobile phone, funds in accordance with the request.

21. The method of claim 1, wherein the location of the mobile phone is determined from at least one of cell phone tower data and GPS data.

* * * * *